US012447482B2

(12) United States Patent
Goettl et al.

(10) Patent No.: US 12,447,482 B2
(45) **Date of Patent: *Oct. 21, 2025**

(54) IN-FLOOR SWIMMING POOL CLEANING HEAD WITH REVERSIBLE BAYONET

(71) Applicant: Goettl Design Group, LLC, Phoenix, AZ (US)

(72) Inventors: Steven James Goettl, Phoenix, AZ (US); John M. Goettl, Phoenix, AZ (US)

(73) Assignee: Goettl Design Group, LLC

( * ) Notice: Subject to any disclaimer, the term of this patent is extended or adjusted under 35 U.S.C. 154(b) by 695 days.

This patent is subject to a terminal disclaimer.

(21) Appl. No.: 17/721,299

(22) Filed: Apr. 14, 2022

(65) Prior Publication Data

US 2025/0215719 A1 Jul. 3, 2025

Related U.S. Application Data

(63) Continuation of application No. 17/721,277, filed on Apr. 14, 2022.

(60) Provisional application No. 63/175,491, filed on Apr. 15, 2021.

(51) Int. Cl.

| | |
|---|---|
| ***E04H 4/16*** | (2006.01) |
| ***B05B 1/00*** | (2006.01) |
| ***B05B 15/74*** | (2018.01) |

(52) U.S. Cl.

CPC ............. *E04H 4/169* (2013.01); *B05B 15/74* (2018.02); *E04H 4/16* (2013.01); *B05B 1/00* (2013.01)

(58) Field of Classification Search

CPC .......... E04H 4/169; E04H 4/16; B05B 15/74; B05B 1/00

See application file for complete search history.

(56) References Cited

U.S. PATENT DOCUMENTS

| | | | | |
|---|---|---|---|---|
| 3,675,252 A | | 7/1972 | Ghiz | |
| 4,188,673 A | | 2/1980 | Carter | |
| 4,193,870 A | | 3/1980 | Goodin | |
| 4,195,371 A | | 4/1980 | Goodin | |
| 4,200,230 A | | 4/1980 | Gould | |
| 4,202,499 A | | 5/1980 | Mathews | |
| 4,322,860 A | | 4/1982 | Gould | |
| 4,347,979 A | | 9/1982 | Mathews | |
| 4,391,005 A | * | 7/1983 | Goettl | E04H 4/169 239/66 |
| 4,462,546 A | | 7/1984 | Pitman | |

(Continued)

FOREIGN PATENT DOCUMENTS

WO 2016069916 5/2016

*Primary Examiner* — Benjamin L Osterhout

(74) *Attorney, Agent, or Firm* — Kenneth C. Booth; Booth Udall, PLC

(57) ABSTRACT

An incrementally rotating in-floor swimming pool cleaning head with retainer body, a nozzle stem, a ratcheting pin, a plurality of cam teeth configured to engage the ratcheting pin, wherein the nozzle stem is configured to reciprocally ratchet, a top ring, and a reversible bayonet. The reversible bayonet includes a plurality of lugs on an inner surface of the reversible bayonet, the plurality of lugs closer to a second end than to a first end, and the plurality of lugs of configured to couple to a bayonet connector of the nozzle stem in each of a first orientation configured for a spring powered retracting nozzle, and a second orientation configured for a weighted retraction nozzle.

20 Claims, 25 Drawing Sheets

(56) References Cited

U.S. PATENT DOCUMENTS

| | | | | |
|---|---|---|---|---|
| 4,486,907 | A | 12/1984 | Carter | |
| 4,640,784 | A | 2/1987 | Cant | |
| 5,048,758 | A | 9/1991 | Jackerson | |
| 5,107,872 | A | 4/1992 | Meincke | |
| 5,251,343 | A * | 10/1993 | Goettl | B05B 15/74 239/206 |
| 6,301,723 | B1 * | 10/2001 | Goettl | E04H 4/169 4/490 |
| 6,367,098 | B1 | 4/2002 | Barnes | |
| 6,393,629 | B1 | 5/2002 | Barnes | |
| 6,419,840 | B1 | 7/2002 | Meincke | |
| 6,438,766 | B1 | 8/2002 | Capdevila Arnau | |
| 6,848,124 | B2 * | 2/2005 | Goettl | E04H 4/169 4/490 |
| 6,971,588 | B1 * | 12/2005 | Tarr | B05B 3/0422 239/206 |
| 7,168,634 | B2 | 1/2007 | Onofrio | |
| 7,578,010 | B2 * | 8/2009 | Goettl | E04H 4/169 4/490 |
| 7,708,212 | B1 | 5/2010 | Conn | |
| 7,819,338 | B1 | 10/2010 | Goettl | |
| 7,979,924 | B1 | 7/2011 | Goettl | |
| 8,056,155 | B1 * | 11/2011 | Goettl | E04H 4/169 4/492 |
| 8,308,081 | B1 | 11/2012 | Goettl | |
| 8,533,874 | B1 | 9/2013 | Goettl | |
| 8,959,739 | B1 | 2/2015 | Goettl | |
| 8,984,677 | B1 * | 3/2015 | Lopez | E04H 4/169 4/492 |
| 9,267,303 | B1 * | 2/2016 | Goettl | E04H 4/169 |
| 9,702,158 | B2 | 7/2017 | Lopez | |
| 10,233,661 | B2 | 3/2019 | Goettl | |
| 10,344,493 | B2 | 7/2019 | Scatterday | |
| 10,837,191 | B1 | 11/2020 | Erbes | |
| 2005/0023373 | A1 * | 2/2005 | Goettl | E04H 4/169 239/203 |
| 2009/0000021 | A1 | 1/2009 | Martin | |
| 2011/0225716 | A1 | 9/2011 | Malinasky, Jr. | |
| 2012/0227175 | A1 | 9/2012 | Ford | |
| 2012/0273593 | A1 | 11/2012 | Clark | |
| 2016/0121345 | A1 * | 5/2016 | Walsh | B05B 7/04 4/492 |
| 2017/0159309 | A1 | 6/2017 | Scatterday | |
| 2019/0301636 | A1 | 10/2019 | Taylor | |

* cited by examiner

IN-FLOOR SWIMMING POOL CLEANING HEAD WITH REVERSIBLE BAYONET

CROSS REFERENCE TO RELATED APPLICATIONS

This application is a continuation application of U.S. patent application Ser. No. 17/721,277, titled "In-Floor Swimming Pool Cleaning Head with Removable Stationary Cam Unit" to Goettl et al. that was filed on Apr. 14, 2022. This application also claims the benefit of the filing date of U.S. Provisional Patent Application Ser. No. 63/175,491 entitled "In-Floor Swimming Pool Cleaning Head" to Goettl et al. that was filed on Apr. 15, 2021, the disclosure of which is hereby incorporated herein by this reference.

TECHNICAL FIELD

Aspects of this document relate generally to in-floor swimming pool cleaning heads.

BACKGROUND

Pool cleaning systems are used in swimming pools to remove dirt and debris from the water in the swimming pool. One method of removing debris includes the use of pop-up spray nozzles beneath the surface of the water on the side walls or floor surface of the pool to spray the debris toward the drain and into the pool water for pumping to the pool filter. Many conventional cleaning nozzles pop up from the surface of the pool as the cleaning heads, normally level with the surface, are extended under the influence of water pressure from the pool pump. When the water pressure from the pump is relieved, the heads retract back into the surface of the pool level with the surface, conventionally in response to either a spring element contained within the cleaning nozzle or a weight. Such pop-up cleaning heads typically operate in a reciprocating fashion and move forward a particular increment each time water is applied to and removed from the cleaning head by the pump.

SUMMARY

Aspects of this document relate to an incrementally rotating in-floor swimming pool cleaning head comprising a retainer body comprising a first end, and a second end opposite the first end of the retainer body with a plurality of locking lugs on an outer surface of the retainer body adjacent the second end of the retainer body, a nozzle stem extending through the retainer body, the nozzle stem comprising a cleaning nozzle at a first end of the nozzle stem and a bayonet connector at a second end of the nozzle stem, a ratcheting pin coupled to the nozzle stem, a plurality of cam teeth within the retainer body and configured to engage the ratcheting pin, wherein the nozzle stem is configured to reciprocally ratchet in a first angular direction in response to intermittent water pressure passing through the nozzle stem as the plurality of cam teeth engage the ratcheting pin, a top ring coupled to the first end of the retainer body and comprising an opening sized to allow the nozzle stem to extend through the top ring, and a reversible bayonet comprising a first end comprising a plurality of spacer ribs extending longitudinally within the reversible bayonet from adjacent the first end to a plurality of lugs extending inward from an inner surface of the reversible bayonet, and a second end, wherein the plurality of lugs is closer to the second end than the first end and the plurality of lugs of the reversible bayonet is configured to couple to the bayonet connector of the nozzle stem in each of a first orientation with the first end of the reversible bayonet closest to the first end of the nozzle stem and a second orientation with the second end of the reversible bayonet closest to the first end of the nozzle stem, wherein when the reversible bayonet is in the first orientation and the cleaning head further comprises a spring washer surrounding the nozzle stem and a spring positioned between the reversible bayonet and the spring washer around the nozzle stem, the cleaning head is configured to operate as a spring powered retracting nozzle, and wherein when the reversible bayonet is in the second orientation and the cleaning head further comprises a retraction weight around the nozzle stem and dampening washer between the retraction weight and the retainer body, the cleaning head is configured to operate as a weighted retraction nozzle.

Particular embodiments may include one or more of the following features. The bayonet connector on the second end of the nozzle stem may further comprise at least one stem lock indent recessed into an outer surface of the nozzle stem and extending longitudinally along a portion of the second end of the nozzle stem on both sides of a bayonet insertion gap recessed into the outer surface of the nozzle stem; and wherein the reversible bayonet further comprises at least one bayonet lock extending longitudinally along the inner surface of the reversible bayonet between the plurality of lugs and the second end of the reversible bayonet; the at least one bayonet lock extending into the at least one stem lock indent of the nozzle stem and engaging the nozzle stem when the reversible bayonet is coupled to the second end of the nozzle stem. The reversible bayonet may be configured to engage the bayonet connector of the nozzle stem through a twist of the reversible bayonet in relation to the nozzle stem. The plurality of cam teeth within the retainer body may exist on an inner surface of a removable cam unit surrounding the nozzle stem within the retainer body. When the plurality of cam teeth on the cam unit engage the ratcheting pin in a first orientation with a first outer edge of the cam unit oriented closest to the top ring, the nozzle stem is configured to reciprocally ratchet in a clockwise direction in response to intermittent water pressure passing through the nozzle stem, and when the plurality of cam teeth on the cam unit engages the ratcheting pin in a second orientation with a second outer edge of the cam unit, opposite the first outer edge, closest to the pin top ring, the nozzle stem is configured to reciprocally ratchet in a counter-clockwise direction in response to intermittent water pressure passing through the nozzle stem.

Aspects of this disclosure relate to an incrementally rotating in-floor swimming pool cleaning head comprising a retainer body comprising a first end, and a second end opposite the first end of the retainer body, a nozzle stem extending through the retainer body, the nozzle stem comprising a cleaning nozzle at a first end of the nozzle stem and a bayonet connector at a second end of the nozzle stem, a ratcheting pin coupled to the nozzle stem, a plurality of cam teeth within the retainer body and configured to engage the ratcheting pin to reciprocally guide the nozzle stem in a first angular direction in response to intermittent water pressure passing through the nozzle stem, a reversible bayonet comprising a first end comprising a plurality of spacers within the reversible bayonet between the first end and a plurality of lugs extending inward from an inner surface of the reversible bayonet, and a second end, wherein the plurality of lugs is closer to the second end than the first end and the plurality of lugs of the reversible bayonet is configured to couple to the bayonet connector of the nozzle stem in each of a first orientation with the first end of the reversible bayonet closest to the first end of the nozzle stem and a second orientation with the second end of the reversible bayonet closest to the first end of the nozzle stem, wherein when the reversible bayonet is in the first orientation, the cleaning head is configured to operate as a spring powered retracting nozzle, and wherein when the reversible bayonet is in the second orientation, the cleaning head is configured to operate as a weighted retraction nozzle.

Particular embodiments may comprise one or more of the following features. The cleaning head further comprising a spring washer surrounding the nozzle stem and a spring positioned between the reversible bayonet and the spring washer. The cleaning head further comprising a retraction weight around the nozzle stem and a dampening washer between the retraction weight and the retainer body. The bayonet connector on the second end of the nozzle stem may further comprise at least one stem lock on an outer surface of the nozzle stem on both sides of a bayonet insertion gap; and wherein the reversible bayonet further comprises at least one bayonet lock on the inner surface of the reversible bayonet between the plurality of lugs and the second end of the reversible bayonet; the at least one bayonet lock matingly engaging with the at least one stem lock and engaging the nozzle stem when the reversible bayonet is coupled to the second end of the nozzle stem in each of the first orientation and the second orientation. The reversible bayonet may be configured to engage the bayonet connector of the nozzle stem through a twist of the reversible bayonet in relation to the nozzle stem. The plurality of cam teeth within the retainer body may exist on an inner surface of a removable cam unit surrounding the nozzle stem within the retainer body. When the plurality of cam teeth on the cam unit engage the ratcheting pin in a first orientation with a first outer edge of the cam unit oriented closest to the top ring, the nozzle stem is configured to reciprocally ratchet in a clockwise direction in response to intermittent water pressure passing through the nozzle stem, and when the plurality of cam teeth on the cam unit engages the ratcheting pin in a second orientation with a second outer edge of the cam unit, opposite the first outer edge, closest to the pin top ring, the nozzle stem is configured to reciprocally ratchet in a counter-clockwise direction in response to intermittent water pressure passing through the nozzle stem.

Aspects of this disclosure relate to an incrementally rotating in-floor swimming pool cleaning head comprising a retainer body, a nozzle stem extending through the retainer body and comprising a cleaning nozzle at a first end of the nozzle stem and a connector at a second end of the nozzle stem, a ratcheting pin coupled to the nozzle stem, a plurality of cam teeth within the retainer body and configured to engage the ratcheting pin to reciprocally guide the nozzle stem in a first angular direction in response to intermittent water pressure passing through the nozzle stem, a reversible bayonet comprising a first end and a second end opposite the first end and having a reversible bayonet connector closer to the second end than to the first end, the reversible bayonet connector configured to engage the connector of the nozzle stem in each of a first orientation with the first end of the reversible bayonet closest to the first end of the nozzle stem and a second orientation with the second end of the reversible bayonet closest to the first end of the nozzle stem.

Particular embodiments may comprise one or more of the following features. When the reversible bayonet is in the first orientation, the cleaning head is configured to operate as a spring powered retracting nozzle, and wherein when the reversible bayonet is in the second orientation, the cleaning head is configured to operate as a weighted retraction nozzle.

The cleaning head further comprising a spring washer surrounding the nozzle stem and a spring positioned between the reversible bayonet and the spring washer. The cleaning head further comprising a retraction weight around the nozzle stem and a dampening washer between the retraction weight and the retainer body. The connector on the second end of the nozzle stem may further comprise at least two stem locks, and wherein the reversible bayonet further comprises at least one bayonet lock on the surface of the reversible bayonet adjacent the second end of the reversible bayonet; the at least one bayonet lock matingly engaging only one of the at least two stem locks and engaging the nozzle stem when the reversible bayonet is coupled to the second end of the nozzle stem in each of the first orientation and the second orientation. The reversible bayonet may be configured to engage the connector of the nozzle stem through a twist of the reversible bayonet in relation to the nozzle stem. The plurality of cam teeth within the retainer body exist on an inner surface of a removable cam unit surrounding the nozzle stem within the retainer body. When the plurality of cam teeth on the cam unit engage the ratcheting pin in a first orientation with a first outer edge of the cam unit oriented closest to the top ring, the nozzle stem is configured to reciprocally ratchet in a clockwise direction in response to intermittent water pressure passing through the nozzle stem, and when the plurality of cam teeth on the cam unit engages the ratcheting pin in a second orientation with a second outer edge of the cam unit, opposite the first outer edge, closest to the pin top ring, the nozzle stem is configured to reciprocally ratchet in a counter-clockwise direction in response to intermittent water pressure passing through the nozzle stem.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the “special” definition of that term and explain how it differs from the plain and ordinary meaning. Absent such clear statements of intent to apply a “special” definition, it is the inventors’ intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words “function,” “means” or “step” in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
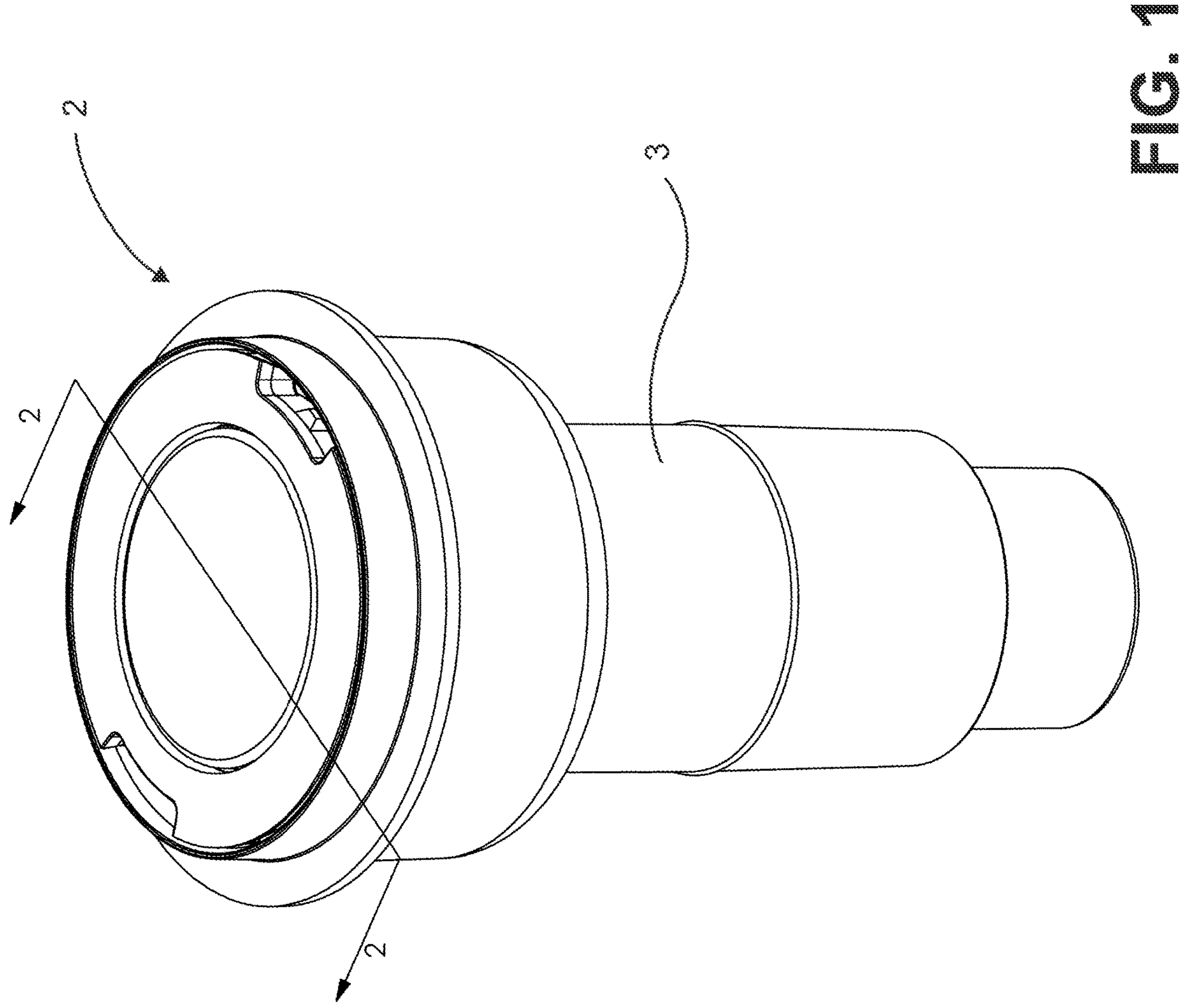
FIG. 1 is a perspective view of an in-floor swimming pool cleaning head showing section line 2-2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to in-floor swimming pool cleaning heads with various improvements over conventional swimming pool cleaning heads. An example of an in-floor cleaning head is illustrated in the image below. The particular improved aspects of the cleaning heads relate to each of: interchangeable and cam unit for modifying the cam logic for different cleaning profiles; and a reversible bayonet connector enabling interchangeable retraction methods for spring to weight. Although each of these different improvement aspects are independently unique and may be used separately in different embodiments of in-floor swimming pool cleaning heads, the images below illustrate all of these features within the same embodiment of an in-floor swimming pool cleaning head. Conventional cleaning heads, are more difficult to redirect than they need to be, are difficult to change the reciprocating pattern without dismantling the cleaning head or changing the cleaning head entirely, and are generally created for a single purpose, single style and single cleaning pattern.

Figure 17:
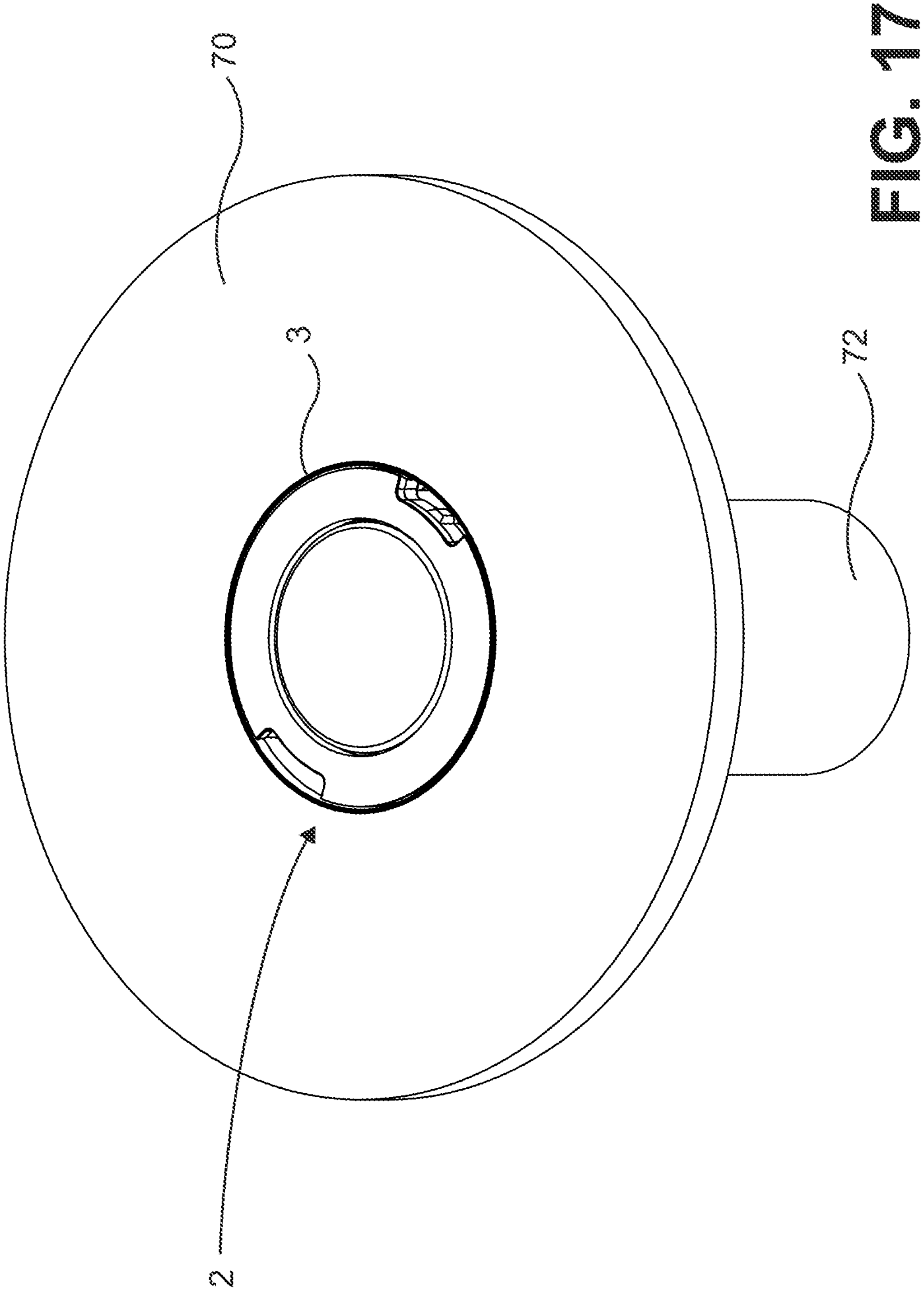
FIG. 17 illustrates an in-floor swimming pool cleaning head mounted in a swimming pool floor.

FIG. 1 is an illustration of an in-floor swimming pool cleaning head 2 mounted within a housing 3. As illustrated in FIG. 17, typically, the housing 3 and swimming pool head 2 is mounted within a surface 70 of a swimming pool and a water supply line 72 is connected in fluid communication with the housing 3. Although the swimming pool cleaning head 2 is referred to as an in-floor swimming pool cleaning head, those of ordinary skill in the art will recognize and understand that the swimming pool cleaning head may be mounted into any surface of a swimming pool including, without limitation, the floors and walls and stairs, and "in-floor" is used only for conventional recognition in the art. Additionally, it should be noted that the particular type of swimming pool is not limited to large swimming pools or swimming pools with plaster surfaces. For example, the same principles and structures applied to the swimming pool cleaning heads discussed herein may also be used with above ground pools, ponds, fiber glass pools, plastic pools, hot tubs, spas, and the like. The term swimming pool is used herein to refer to any body of water with a surface that needs to be cleaned through water spray beneath the body of water.

Generally, a pop-up, incrementally rotating-type of swimming pool cleaning head is typically operated through intermittent activation of the cleaning head through a pump that supplies water to the cleaning head on an intermittent, cyclical basis. Each time pressurized water is applied to the cleaning head, the water pressure raises the cleaning head to an extended position, causing the cleaning head to ratchet forward to a new position and spray water into the swimming pool until the water pressure is releases. When the water pressure is released, the cleaning head lowers back into the housing toward a retracted, resting position, and the cleaning head is guided by a cam gear to that position. When the water is again applied to the cleaning head, the cleaning head is guided again by the cam gear to a new extended position rotated further than the previous extended position in a particular direction. This type of pop-up, incrementally rotating cleaning head generally is known in the art, an example of which is disclosed in U.S. Pat. No. 5,251,343 to Goettl, titled "Swimming Pool Pop-up Fitting", the disclosure of which is incorporated herein by this reference for its general explanation of the operation and conventional structure of this type of swimming pool cleaning head.

Figure 2:
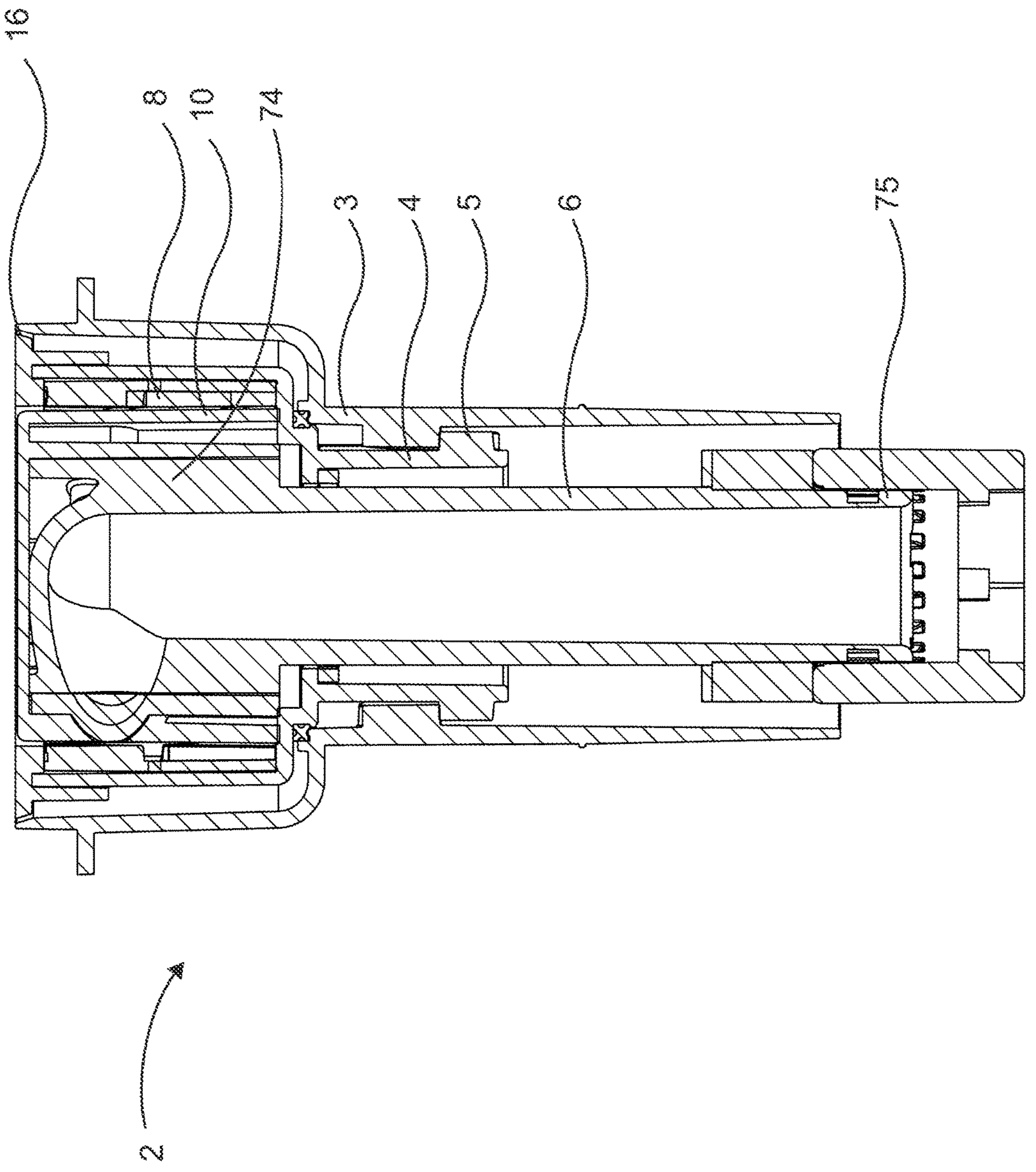
FIG. 2 is a cross-sectional-view of the in-floor swimming pool cleaning head of FIG. 1 taken along section line 2-2.

FIG. 2 represents a cross-sectional view of the cleaning head of FIG. 1, taken along section line 2-2. Specifically, FIG. 2 shows the housing 3, a retainer body 4 engaged with the housing 3 through retainer body lugs 5, a nozzle stem 6 reciprocally mounted in the retainer body 4, a cam unit 8, a cleaning head cap 10, and a top ring 16 engaged with the retainer body 4. The particular embodiment of a cleaning head 2 illustrated is configured for operation as a weighted retraction cleaning head as explained in more detail below.

Figure 3:
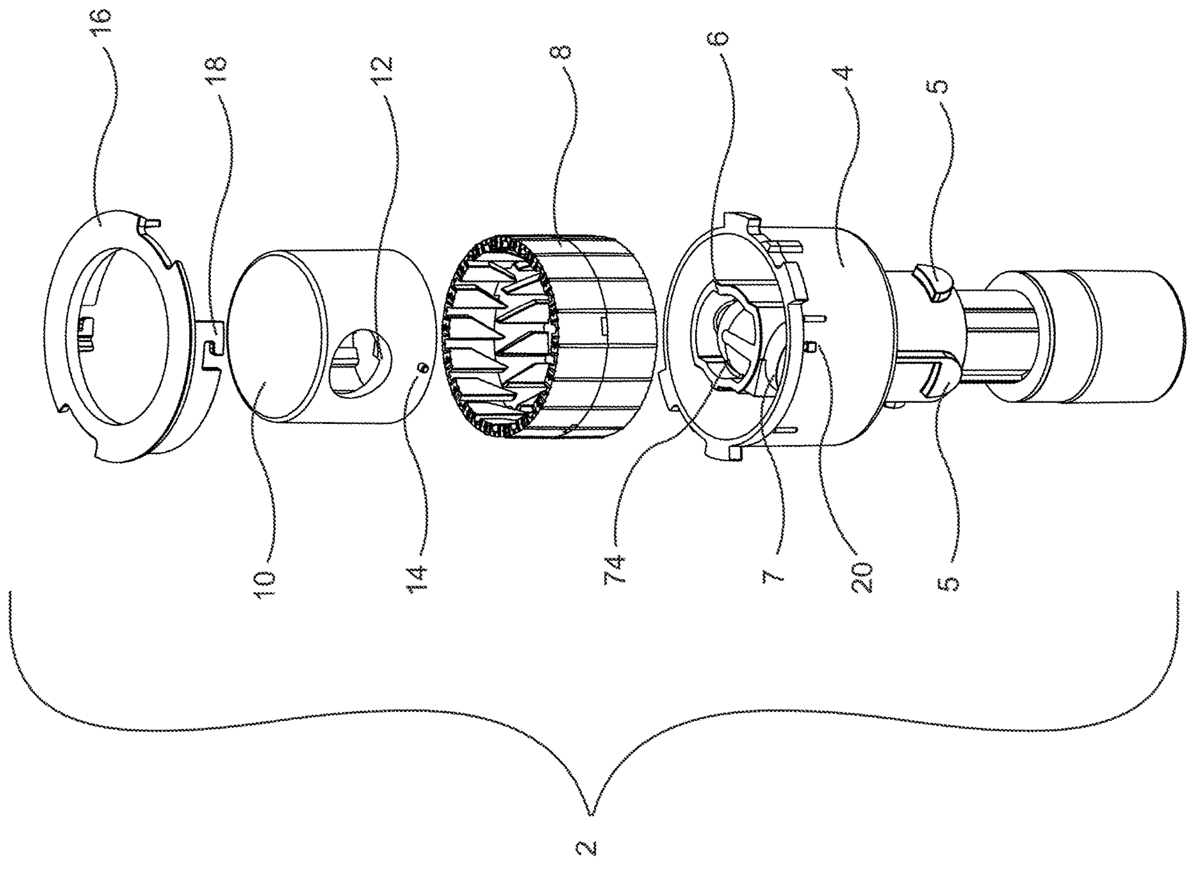
FIG. 3 is an exploded view of the in-floor swimming pool cleaning head of FIG. 1 showing an order of assembly of components.

FIG. 3 illustrates a partially exploded view of the cleaning head 2 of FIG. 1, with the housing 3 removed for clarity of illustration. Specifically, FIG. 3 shows the retainer body 4, retainer body lugs 5 used to engage with corresponding lugs on the housing 3 (FIG. 2), the nozzle stem 6 and nozzle stem opening 7 through which water sprays when the cleaning head 2 is under water pressure through the nozzle stem 6. A cam unit 8 sits within the retainer body 4, surrounding the nozzle stem 6. A cleaning head cap 10 is mounted to the first end of the nozzle stem 6 and has a cap nozzle 12 aligned with the cleaning nozzle opening 7. A ratcheting pin 14 is coupled to the nozzle stem 6 through the cleaning head cap 10 being mounted on the nozzle stem 6, though in particular embodiments, the ratcheting pin 14 may alternatively be directly connected to the nozzle stem 6. The ratcheting pin 14 is engaged by the cam unit 8 as explained more fully below. A top ring 16 surrounds the top of the cleaning head cap 10 and engages the retainer body 4 through a locking mechanism that includes locking top ring lugs 18.

Figure 4:
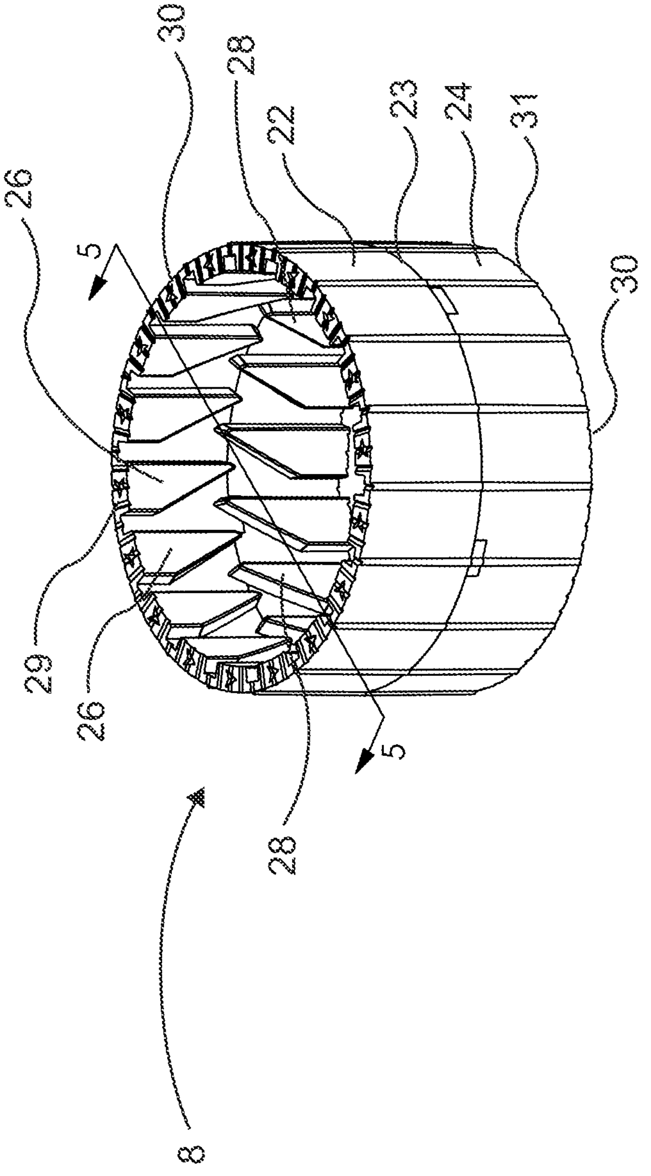
FIG. 4 is a perspective view of a cam unit of an in-floor swimming pool cleaning head showing section line 5-5.
Figure 5:
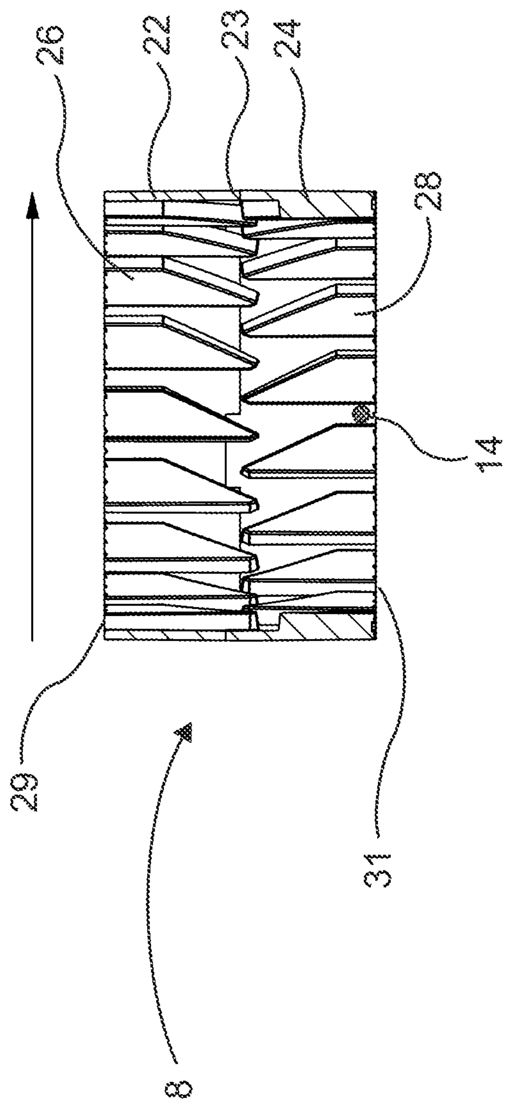
FIG. 5 is a cross-sectional view of the cam unit of FIG. 4 taken along section line 5-5 and positioned for nozzle head rotation in a first direction.
Figure 6:
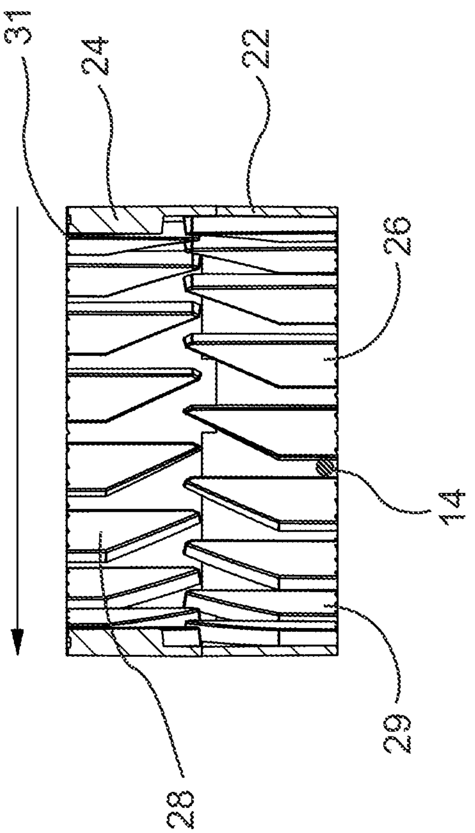
FIG. 6 is a cross-sectional view of the cam unit of FIG. 4 taken along section line 5-5 and positioned for nozzle head rotation in a second direction, opposite the first direction.

FIG. 4 illustrates a close-up, perspective view of a cam unit 8, and FIG. 5 illustrates a cross-sectional view of the cam unit 8 of FIG. 4, taken along cross-section line 5-5. FIG. 6 illustrates a cross-sectional view of the cam unit 8 of FIG. 4, also taken along cross-section line 5-5, but with the cam unit 8 flipped upside down to change its direction of operation. The cam unit of this particular embodiment includes a cam first half 22 and a cam second half 24 coupled to the cam first half 22 such that the rotational orientations of the cam first half 22 and the cam second half 24 are fixed in relation to each other. In particular embodiments, the cam first half 22 and the cam second half 24 are fixedly attached to each other, and in some particular embodiments, they are permanently adhered to each other so that they cannot be detached without damaging one or the other of them. In any case, however, the cam unit components are stationary in relation to each other and do not include any moving parts. Conventional cam units that are removable include moving parts that complicate manufacturing and assembly, and are not assembled as an integrated, single piece, complicating replacement of parts due to the various components falling apart and misaligning during assembly. A single, stationary cam unit 8, or even a two-part stationary cam unit 8 simplifies assembly of the cleaning head 8 and replacement of the cam unit 8 for a cam unit 8 of a different reciprocation configuration for different movement and operation of the cleaning head 2. By using a replaceable, stationary cam unit 8, the cleaning head 2 and its relevant operation and function is completely modifiable and easily reconfigured to any operational configuration.

The cam first half 22 includes first half teeth 26 that are narrower toward a center 23 of the cam unit 8 than toward a first edge 29 of the cam unit 8. The cam second half 24 includes second half teeth 28 that are narrower toward a center 23 of the cam unit 8 than toward a second edge 31 of the cam unit 8.

Figure 18:
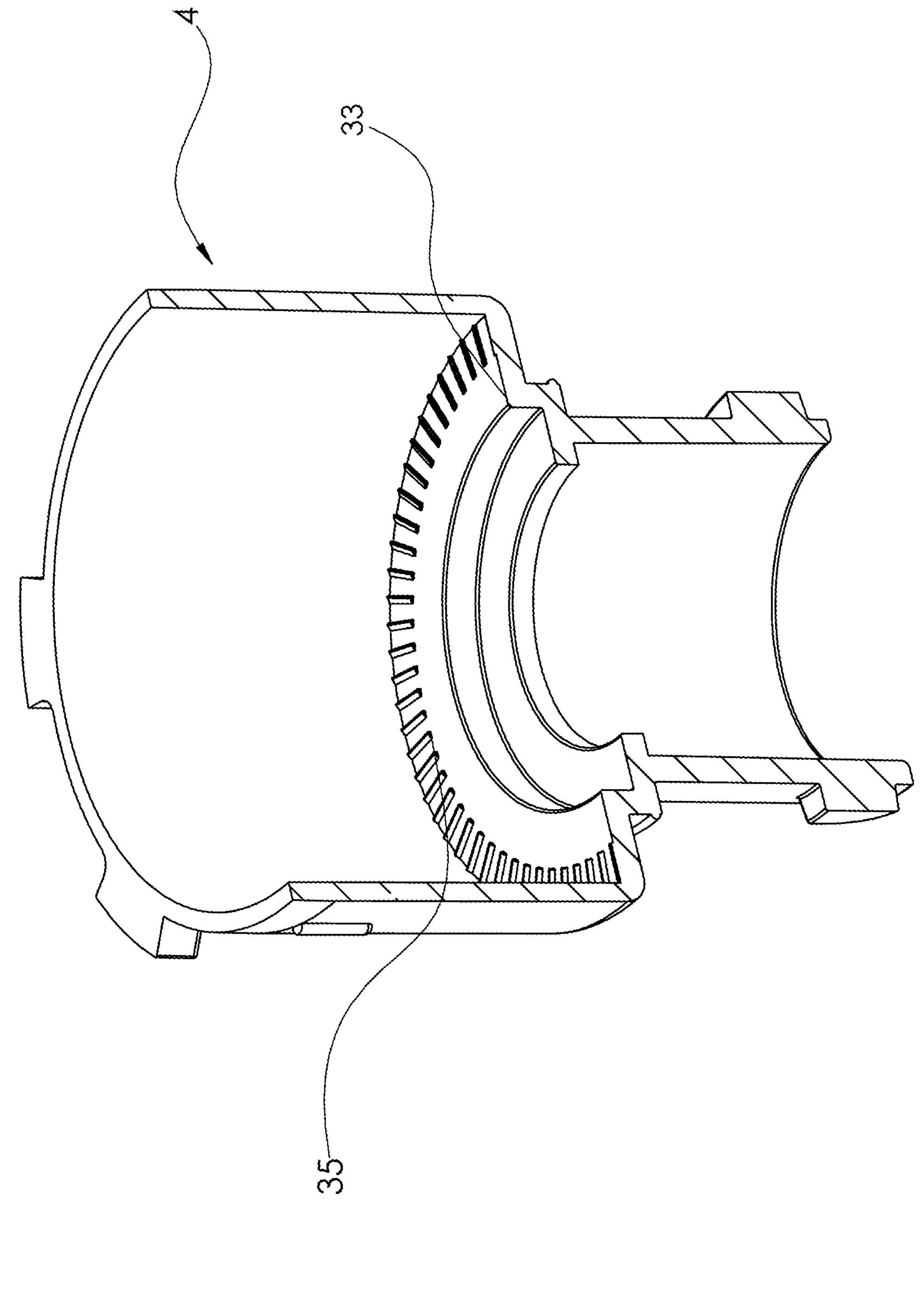
FIG. 18 is a cross-sectional-view of the in-floor swimming pool cleaning head of FIG. 1 taken along section line 2-2, but illustrating only the retainer body and in perspective to show the angled surfaces.

The cam unit 8 also includes a positioning key 30 that mates with the retainer body 4, in a stiff ratcheting fashion, such as through a corresponding surface on the retainer body 4, to engage and restrict rotation of the cam unit 8 around the nozzle stem 6 as the nozzle stem 6 reciprocates within the retainer body 4 and the ratcheting pin 14 engages and is guided by the first half teeth 26 and the second half teeth 28. In this particular embodiment, the positioning key 30 is formed on the first edge 29 and the second edge 31 of the cam unit 8, and a corresponding shaped surface 33 is included on the inside of the retainer body 4 (see FIG. 18) to positionally lock the cam unit 8 within the retainer body 4 when the locking top ring 16 is locked onto the retainer body 4 over the cam unit 8 and the nozzle stem 6 is in its retracted position. However, in this particular embodiment, the corresponding shaped surface 33 of the retainer body 4 includes ramped surfaces 35 angled in a single rotational direction and includes stops in the opposite direction to allow the nozzle stem 16 and cam 8 to ratchet in one rotational direction within the retainer body 4, but not the other direction. By including the ramped surfaces 35 that angle the corresponding shaped surface 33 in one direction, an installer, when the cleaning head 2 is assembled and in its extended position, may manually rotate the nozzle stem 16 in that angled direction, typically clockwise, but not the opposite direction, typically counter-clockwise, to align the nozzle stem 16 and nozzle opening 7 in a desired direction. The choice of clockwise and counter-clockwise direction rotations allows the installer to tighten the cleaning head in place in a first direction, and then rotate the nozzle stem 16 in the other direction without loosening the retainer body 4 from the housing 3. In other embodiments, the corresponding shaped surface 33 matches the positioning key 30 surface so that rotational movement after the top ring 16 is locked onto the retainer body 4.

By allowing the cam unit 8 to be completely replaced and positioned in whatever angular orientation is needed, the installer can simply drop in a cam unit 8 with a desired reciprocation pattern and then rotate it angularly until the starting direction for the pattern matches the desired starting direction for the cleaning head 2. In this way, the installer can use a generic retainer body 4 that is not configured for any particular reciprocation pattern or direction, and drop in an appropriately configured cam unit 8 and orient it for wherever the cleaning head is already installed to get the desired function and reciprocation pattern for the cleaning head without the need to replace the entire cleaning head 2. For example, a first installer could install all of the retainer bodies 4 into a swimming pool surface regardless of orientation or type. Then the first installer, or a second installer, could come back at a later time and install the appropriate cam units 8 into the cleaning heads 2 based on the locations of the cleaning heads 2 in the swimming pool. Corner- and stair-positioned cleaning heads could have appropriate cam units 8 installed, and those that need to rotate clockwise or counter-clockwise could also be installed to give the ideal pool cleaning environment with the same cleaning head retainer bodies and components used, and only the cam units 8 being different.

FIG. 5 illustrates the ratcheting pin 14 that is coupled to the nozzle stem. Similar to a conventional pop-up incrementally ratcheting cleaning head operation, each time water pressure is applied to the cleaning head 2 to push the nozzle stem 6 (FIG. 2) to an extended position (see FIG. 7), the teeth 26, 28 within the cam unit 8 guide the ratcheting pin 14 forward in a direction of rotation indicated by the arrow pointing to the right in FIG. 5 above the cam unit 8. When water pressure is relieved from the cleaning head 2, the nozzle stem 6 drops into a retracted position and the ratcheting pin 14 moves forward in the direction of rotation.

Figure 7:
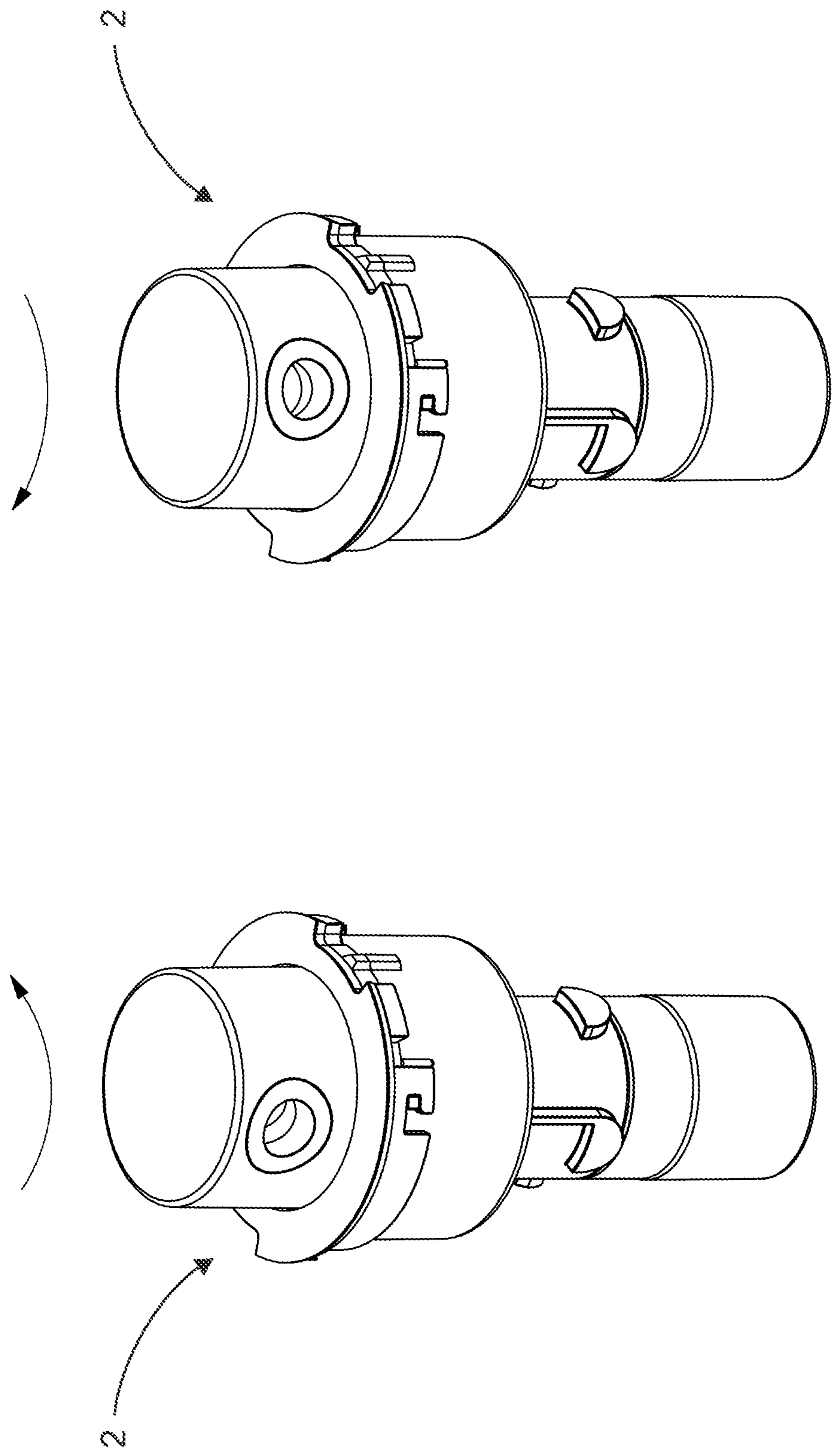
FIG. 7 is a perspective view of two in-floor swimming pool cleaning heads with a first head configured to rotate counter-clockwise, and a second head configured to rotate clockwise.

Different from conventional pop-up incrementally ratcheting cleaning heads, however, which require a different model of cleaning head or a different cam unit to be used to change direction of rotation for the ratcheting pin 14 and nozzle stem 6, the present disclosure teaches a cam unit 8. By removing the locking top ring 16, removing the cam unit 8, flipping the cam unit 8 upside down (180 degree flip), the same, unchanged cam unit 8 without moving parts can be used to configure the cleaning head 2 to guide the ratcheting pin 14 and nozzle stem 6 in the opposite direction. In other words, in relation to the embodiment illustrated in FIG. 5, where the cam unit 8 is mounted with the retainer body 4 with the first cam half 22 is closest the top ring 16 (see FIGS. 2-3), the ratcheting pin 14 and nozzle stem 6 will rotate in relation to the retainer body 4 in a clockwise direction. However, as illustrated in FIG. 6, by turning the cam unit 8 upside down with the second cam half 24 closest to the top ring 16, the ratcheting pin 14 and nozzle stem 6 will rotate in relation to the retainer body 4 in a counter clockwise direction. FIG. 7 illustrates two adjacent cleaning heads 2 with the cleaning head 2 on the left configured by a first cam unit 8 in a first orientation causing a counter clockwise rotation, and the cleaning head on the right configured by a second cam unit 8 that is identical to the first cam unit 8 in a second orientation causing a clockwise rotation of the cleaning head 2. In addition to removing and flipping the cam unit 8, the cam unit 8 is interchangeable with another cam unit of a different or the same tooth pattern.

Figure 8A:
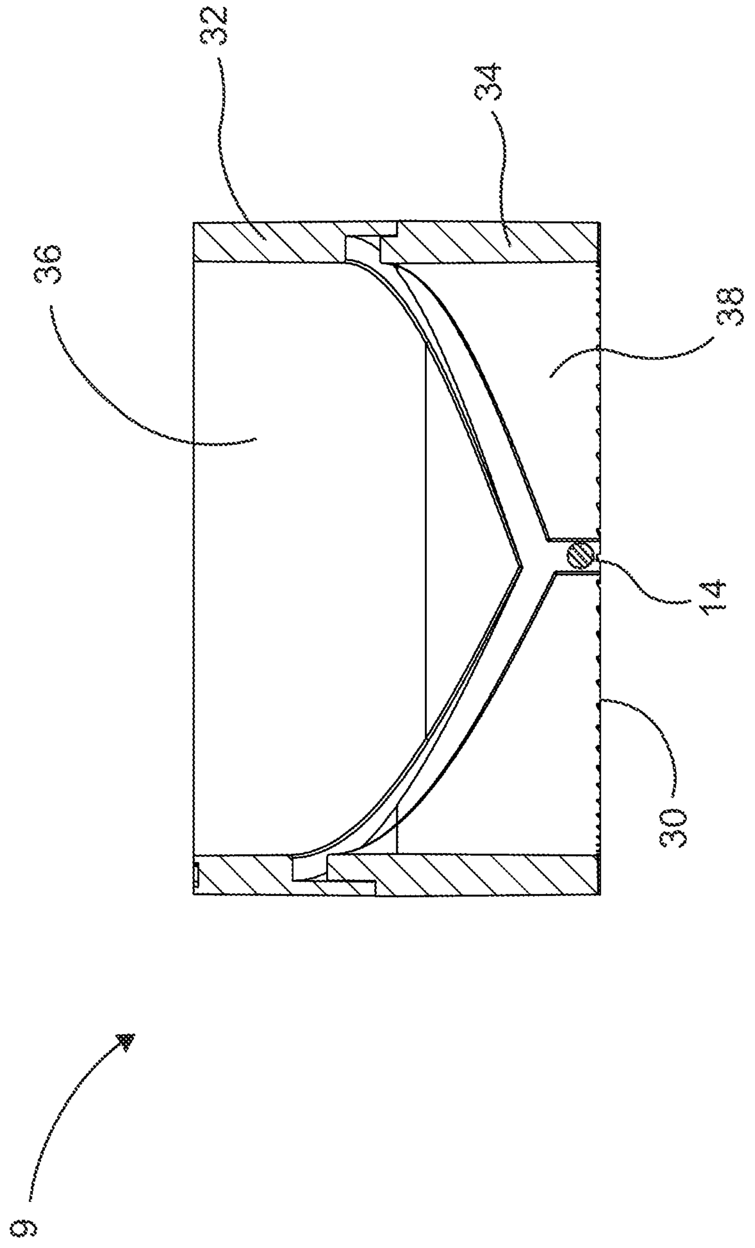
FIGS. 8A and 8B are two illustrations of cross-sectional views of cam units like those shown in FIG. 6, but having irregular cam patterns configured for nozzle head movement of different distances.
Figure 8B:
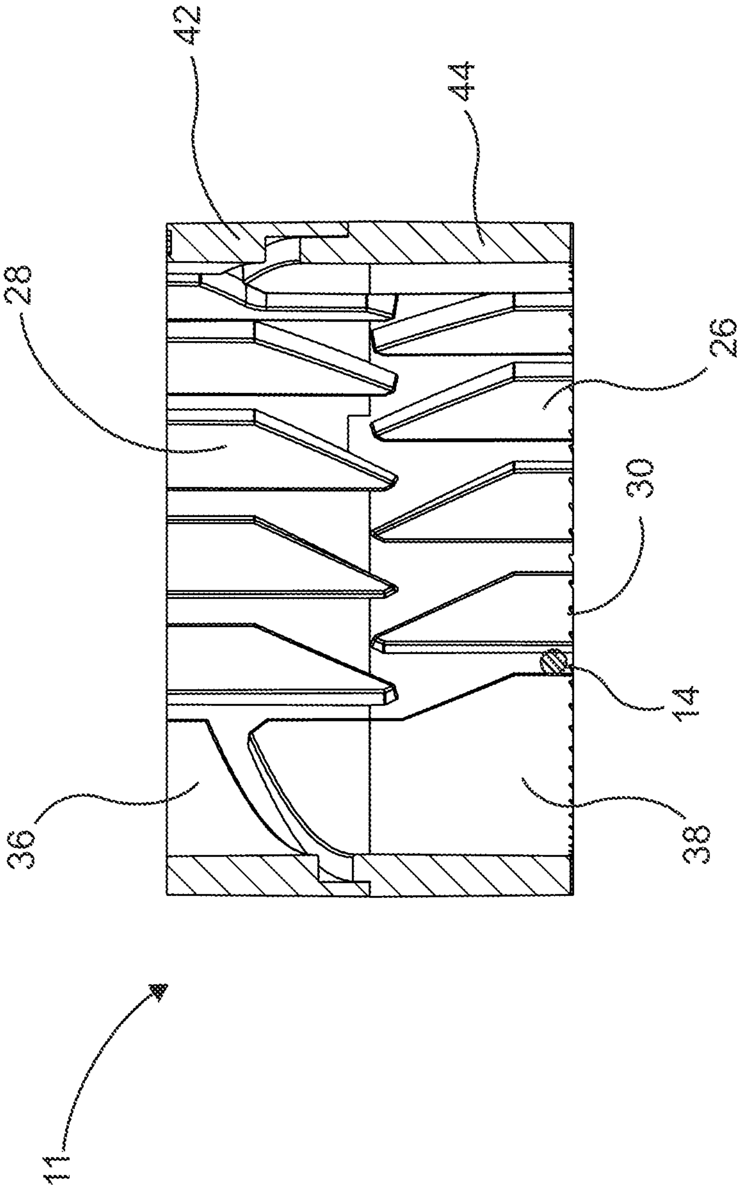

FIG. 8A illustrates another embodiment of a cam unit 9 to emphasize that the length of rotational sweep for the ratcheting pin 14 and nozzle stem 6 need not be limited to short reciprocating movements. By creating a longer channel for the ratcheting pin 14, the pin can travel farther distances in a single reciprocation cycle. In this way, cam units 9 may be configured to have differing nozzle positioning for differing needs of swimming pools. Depending upon the need, first cam half 32 may be configured with a first shape of first cam tooth 36, and second cam half 34 may be configured with a second shape of second cam tooth 38 to create the ratcheting pin 14 path between those cooperating teeth shapes. Also, in the example provided in FIG. 8B, it is contemplated that a cam unit 11 may be used having differing, or inconsistent travel paths may be used by creating teeth 26, 28 of a first dimension, and other teeth 36, 38 of other dimensions different from the first teeth type. First cam half 42 and second cam half 44 are still joined to restrict relative movement and allow both halves 42, 44 to be removed and manipulated together as a single piece. In other embodiments, the cam unit 9 may be a single piece and not formed separately and attached together. As illustrated by the examples in FIGS. 8A and 8B, not all cam units need be formed as reversible cam units. Although all cam units discussed herein are replaceable within a generic retainer body 4 so that the cam unit 8, 9, 11 can be swapped out to change the reciprocation pattern and direction of the cleaning head 2 without replacing any hardware except the cam unit, the cam units 8, 9, 11 may be configured with or without the ability to be flipped and used in a different rotation direction.

By utilizing various different cam unit profiles, multiple variations of swimming pool cleaning profiles can be achieved. In the examples provided above in FIGS. 8A and 8B, by including standard spacing for the cam unit 9, 11 on one side, e.g. 9-20 degree step cam steps, and wide structure along the other side of the cam unit 9, 11, e.g. 1-180 degree step cam step (single downstroke and single upstroke), a relatively inexpensive change in a cam unit can change a cleaning head profile from a head that cleans 360 degrees of its rotation to a head that only cleans on 180 degrees of its rotation.

Figure 9:
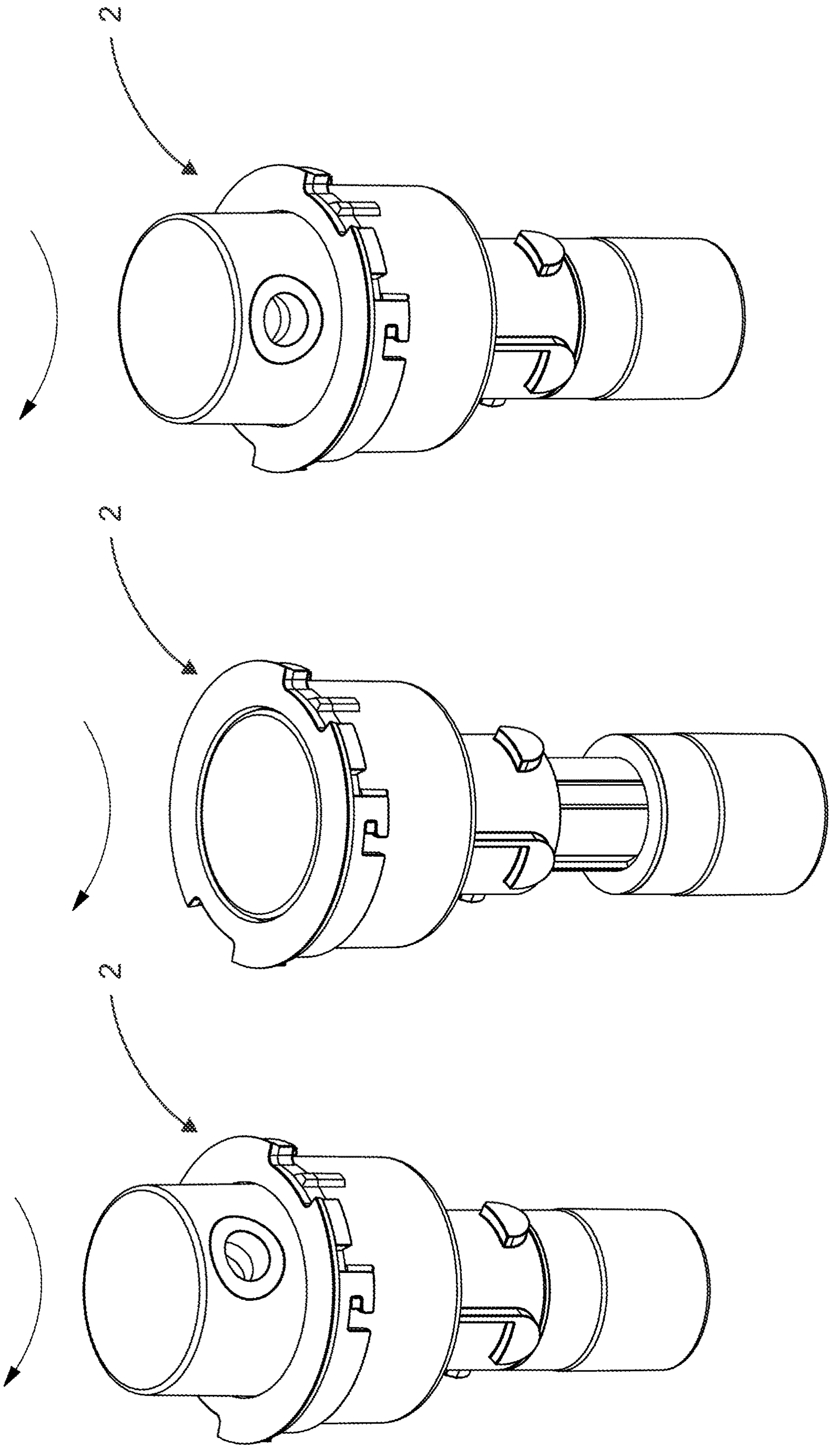
FIG. 9 illustrates an in-floor swimming pool cleaning head with a regularly spaced cam unit in three different positions.
Figure 10:
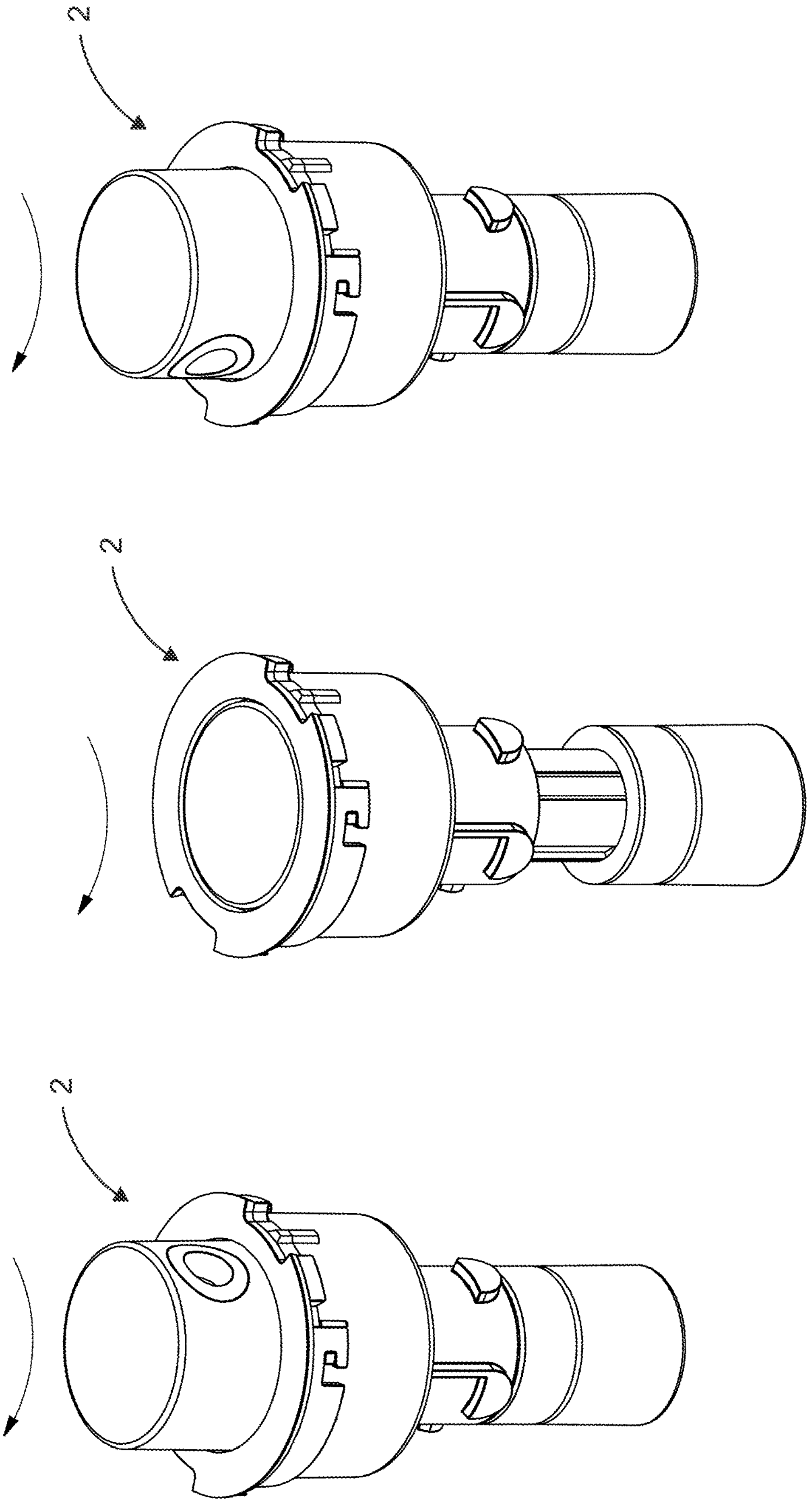
FIG. 10 illustrates the in-floor swimming pool cleaning head of FIG. 9 with the cam unit replaced with an irregularly spaced cam unit in three different positions.

FIG. 9 shows three positions of a cleaning head 2 within sequential pressure cycles beginning on the left of the illustration. The cleaning head 2 view on the left is in a first position with water pressure applied and the cam unit 8, 9, 11 positioned to cause the cleaning head 2 to rotate clockwise. At the end of the cycle, water pressure is relieved, and the cleaning head 2 retracts as shown in the middle view of the cleaning head 2. When the next cycle starts and water pressure is again applied to the cleaning head 2, the cleaning head raises with the nozzle stem positioned farther clockwise than it was in the previous cycle. Comparing FIG. 9 to FIG. 10, with the same process and the cleaning head 2 view on the right being the cycle immediately following the cleaning head 2 view on the left, shows that by replacing the cam unit 8, 9, 11 with a different cam unit 8, 9, 11 having a different tooth configuration, the cleaning head 2 can rotate different distance during a single cycle. This may be useful in avoiding particular swimming pool surfaces with a cleaning nozzle, like on stairs or immediately adjacent a wall where too much spray can erode the swimming pool surface unnecessarily or direct cleaning effort is not necessary. In other areas of the swimming pool, additional, smaller increment cleaning effort may be needed.

Figure 11:
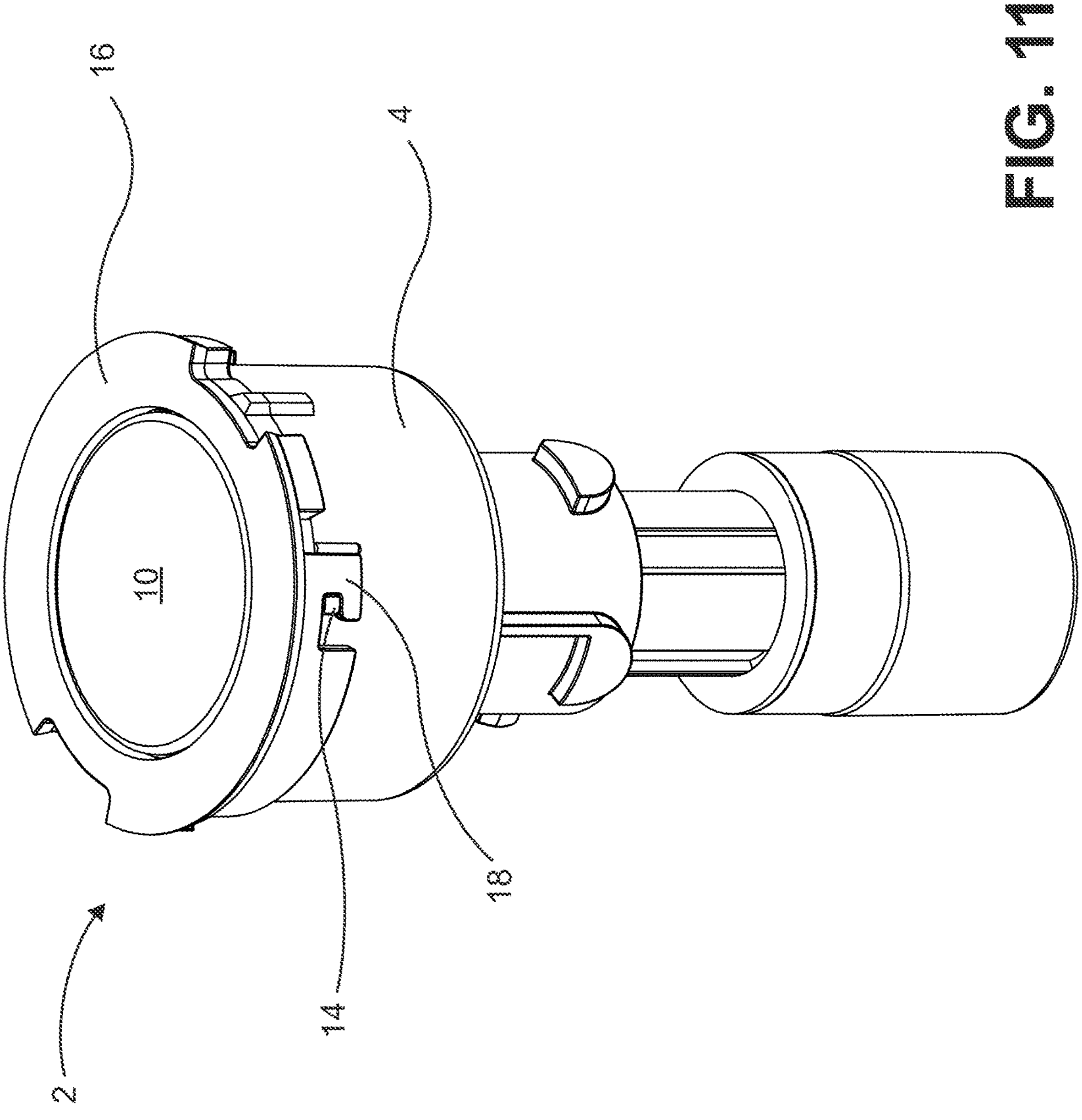
FIG. 11 illustrates a perspective view of an in-floor swimming pool cleaning head with a removable locking top ring.
Figure 12A:
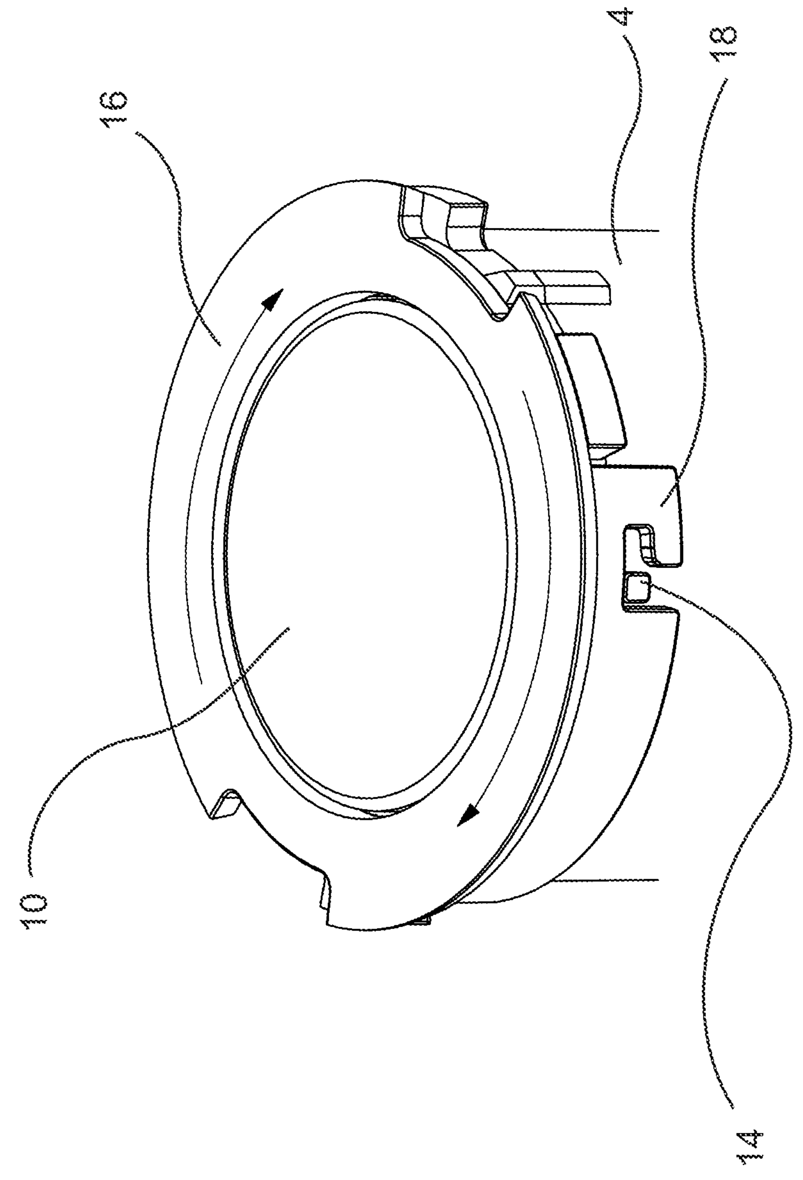
FIGS. 12A and 12B illustrate close-up views of the locking top ring showing, respectively, the locking ring in the unlocked and locked positions.
Figure 12B:
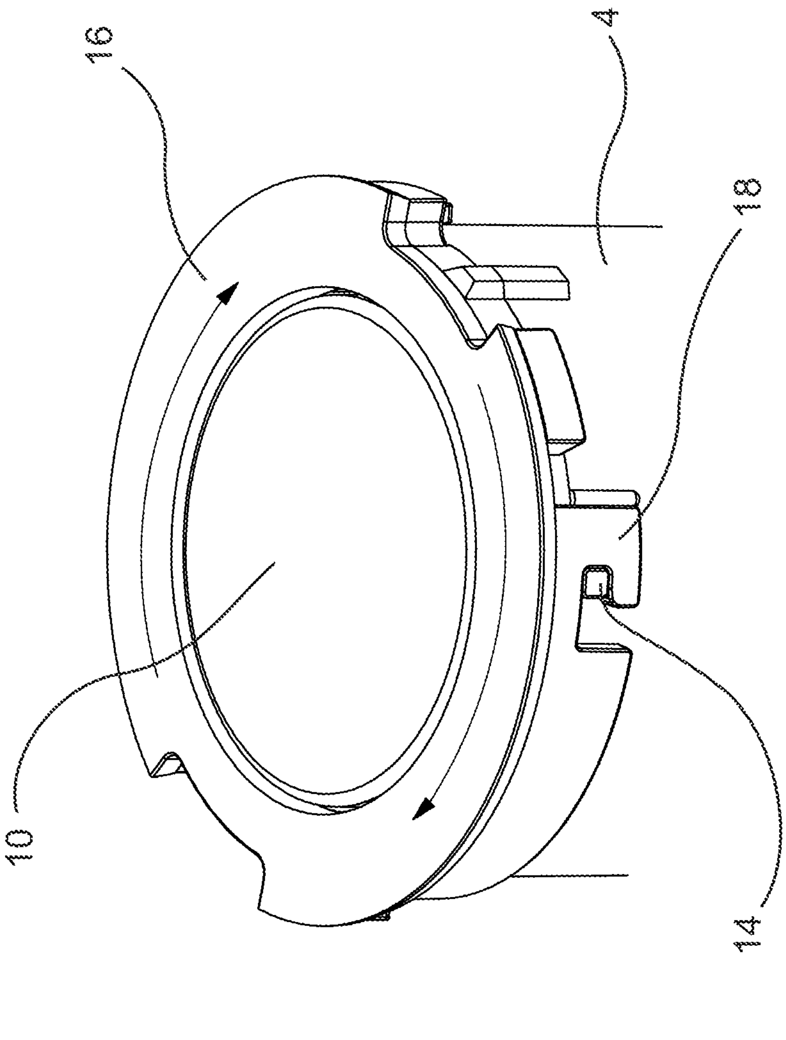

FIG. 11 illustrates some of the detail of the locking top ring 16 of a cleaning head 2. The locking top ring 16 surrounds the opening at the top of the cleaning head 2. The locking top ring 16 includes at least one locking lug 18 that engages a corresponding at least one retainer body locking lug 18 on the retainer body 4. FIGS. 12A and 12B illustrate, respectively, unlocked and locked positions of the locking top ring, and a locking direction of rotation illustrated by the rotational arrows provided on the top of the top ring 16. The cleaning head cap 10 extends into the top ring 16 opening, and the nozzle stem 6 extends through the top ring 16 when the nozzle stem 6 is in its extended position.

By enabling the cleaning head 2 to be configured for rotation in different directions and with different incremental rotation patterns simply and inexpensively without additional moving parts or complex cam configurations, the same cleaning head 2 unit may be used for many more spray need situations without the need for installers to carry multiple different models of cleaning heads.

Furthermore, other modifications may be made to swimming pool cleaning heads 2 adapt a single model of cleaning head 2 to different use scenarios rather than swapping out for a different model and hardware. Conventionally, in-floor swimming pool cleaning heads are manufactured to operate either by a spring pushing the cleaning head back to its retracted position when water pressure is removed from the nozzle, or a weight is used to pull the cleaning head down by the force of gravity. Both methods of retracting the head has its distinct set of advantages and disadvantages depending upon the application of the cleaning head to the in-floor cleaning system (e.g. horizontal application of the cleaning head versus vertical application).

Typically, several models of cleaning heads must be designed and manufactured for these different applications, and installers must maintain a supply of each when installing a pool. When water pressure is introduced to the cleaning head, the pressure pushes the head in an upward direction. Movement of the head in the upward direction is stopped by the contact with the retainer body of an end support that is attached on the bottom of the stem. In order to provide appropriate stroke length for the head movement with a spring or weight configuration, different stem lengths and configurations are required for the different cleaning head models depending on whether they are designed for spring retraction or weighted retraction.

Figure 13A:
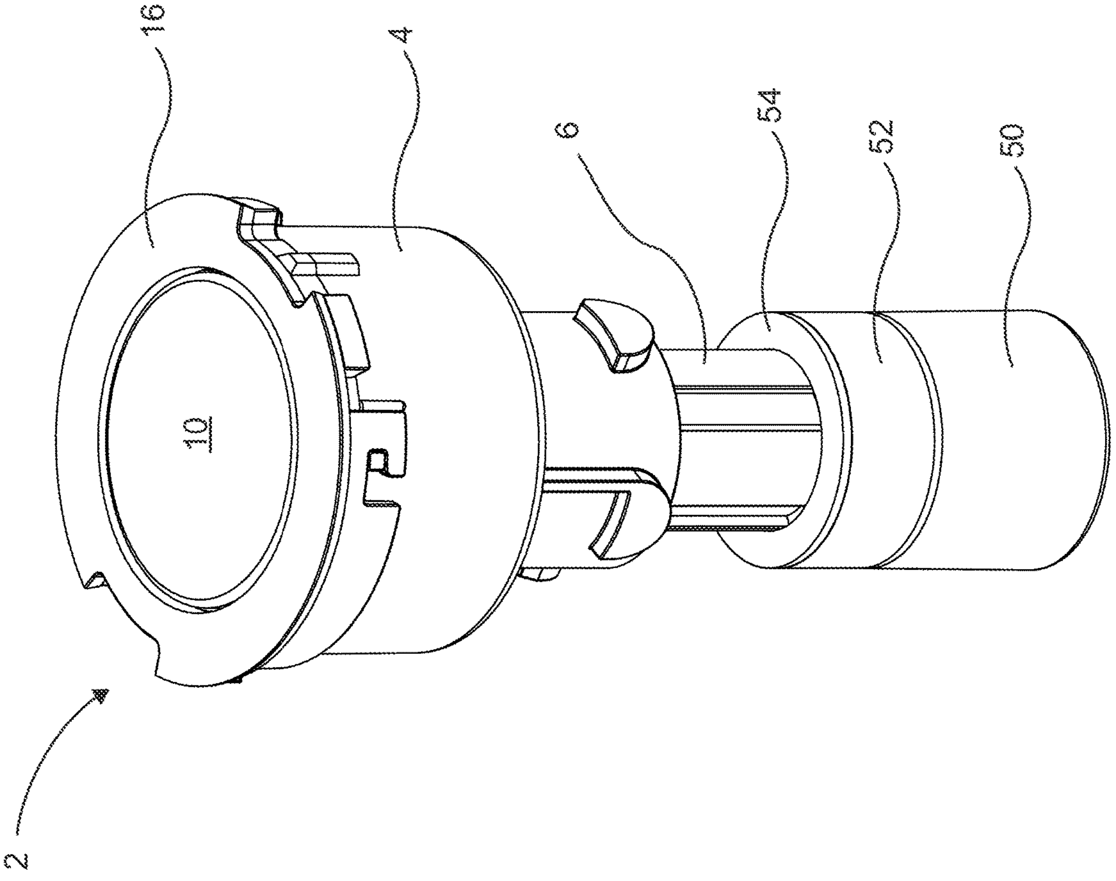
FIGS. 13A and 13B illustrate, respectively, a weight retraction system and a spring retraction system each attached to the same in-floor swimming pool cleaning head body.
Figure 13B:
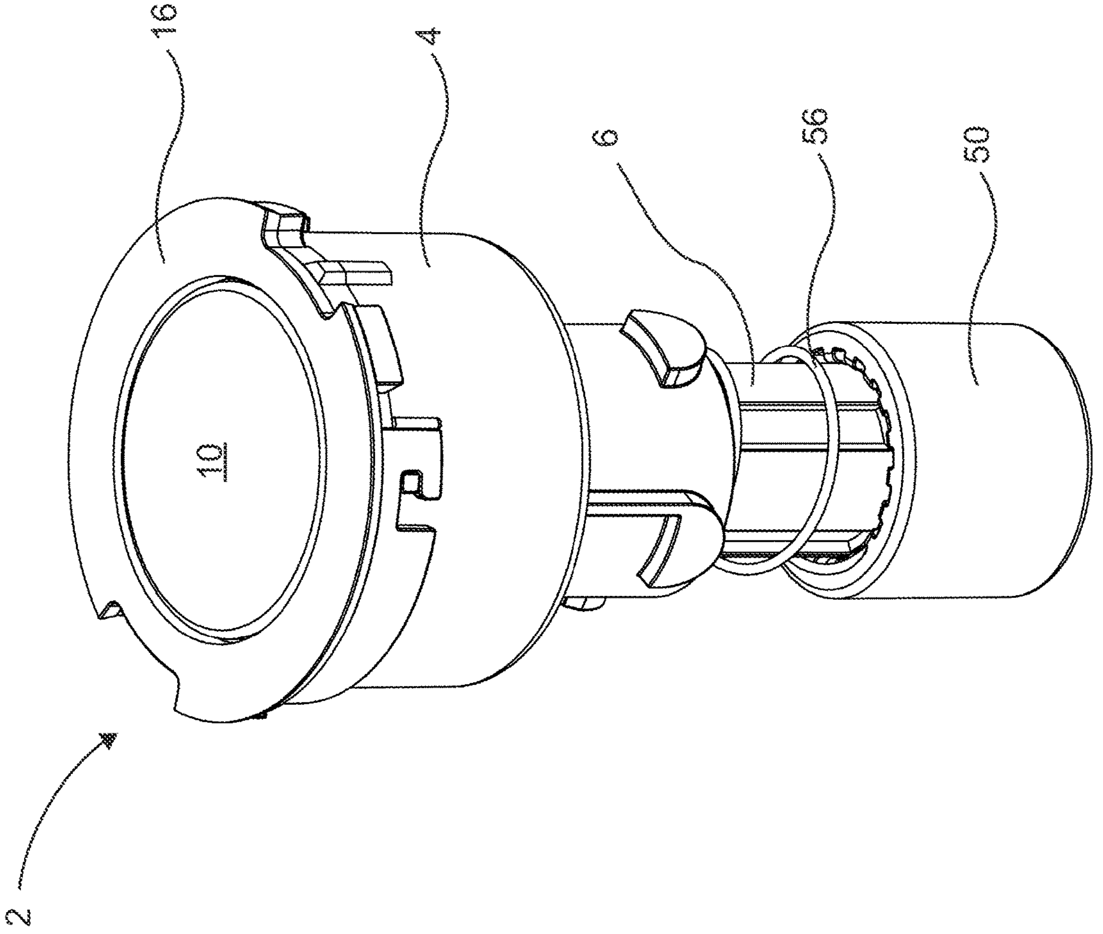

FIGS. 13A and 13B illustrate two different configurations of the same cleaning head 2. FIG. 13A illustrates a cleaning head 2 that includes the retainer body 4, nozzle stem 6 reciprocally mounted in the retainer body, top ring 16 engaged to the retainer body 4 with a cleaning head cap 10 mounted to the top of the nozzle stem 6. The embodiment in FIG. 13A specifically is configured for use as a weighted retraction cleaning head. A weight 52 surrounds the nozzle stem 6, and a dampening washer 54 is positioned between the weight 52 and the retainer body 4. A reversible bayonet 50 is mechanically attached to a second end of the nozzle stem 6. When water pressure is relieved from the cleaning head, the weight 52, through force of gravity, draws the nozzle stem 6 back to its retracted position. FIG. 13B illustrates the same cleaning head 2 shown in FIG. 13A, but configured as a spring retraction cleaning head. The same retainer body 4, nozzle stem 6, cleaning head cap 10, top ring and reversible bayonet 50 are used, but the weight 52 and dampening washer 54 of FIG. 13A are replaced with a spring 56 and spring washer 58 (FIGS. 14B, 15B). When water pressure is relieved from the cleaning head, the spring 56, through force of the spring expanding toward its unbiased extent, draws the nozzle stem 6 back to its retracted position.

Figure 14A:
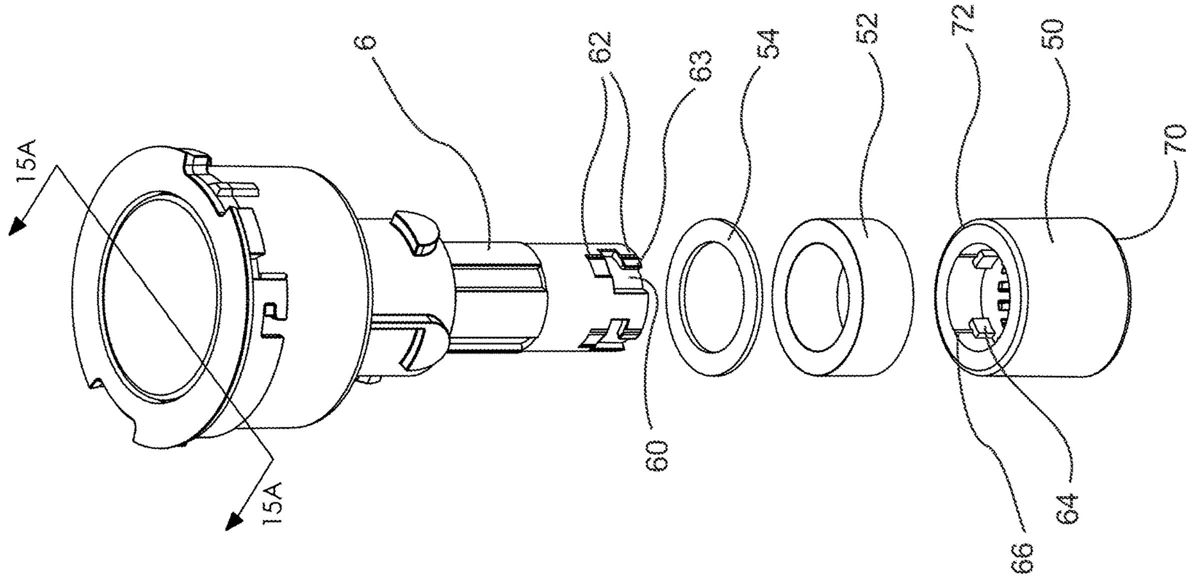
FIGS. 14A and 14B illustrate, respectively, exploded views of the respective weight retraction system and spring retraction system of FIGS. 13A and 13B, respectively showing section lines 15A-15A and 15B-15B.
Figure 14B:
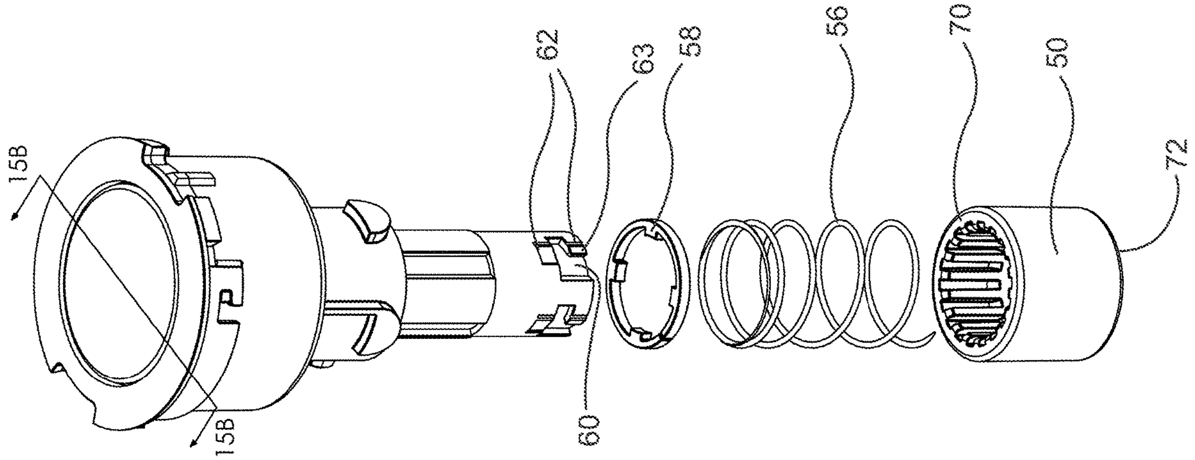
Figure 15A:
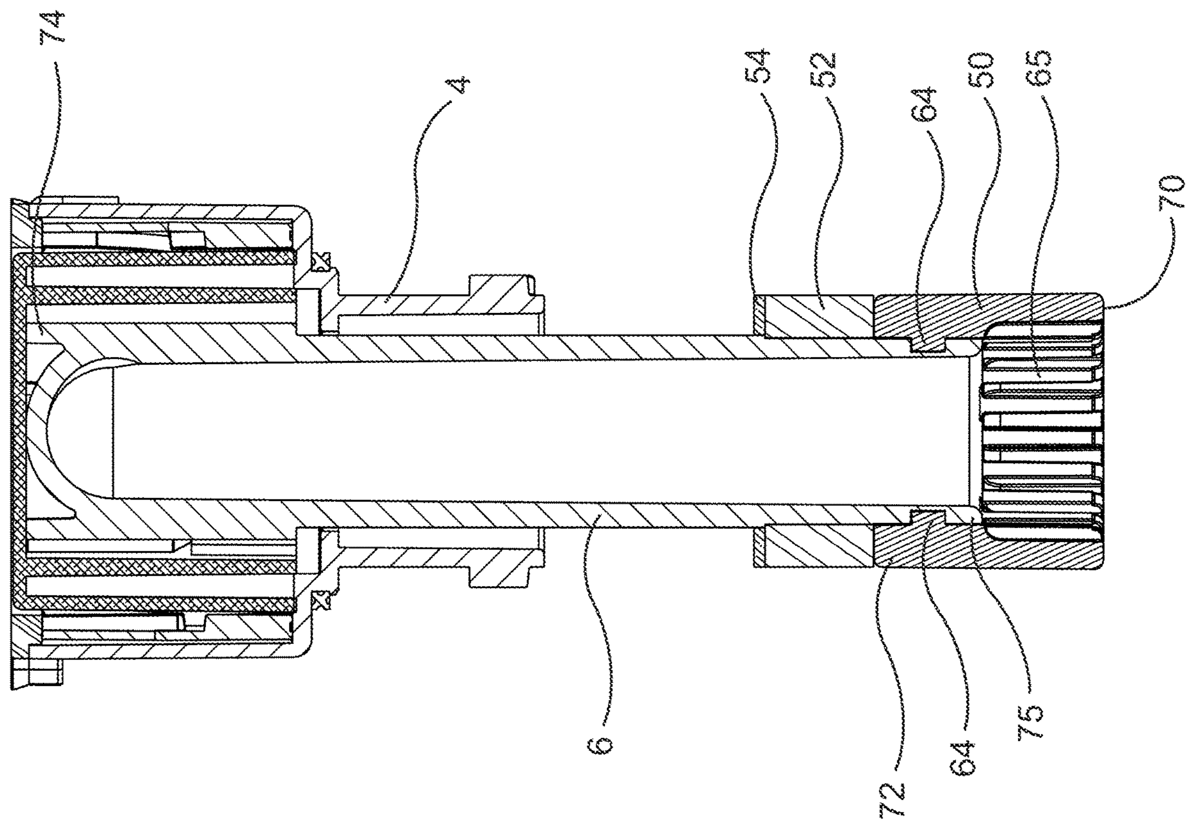
FIGS. 15A and 15B illustrate, respectively, cross-sectional views of FIGS. 14A and 14B taken along respective section lines 15A-15A and 15B-15B.
Figure 15B:
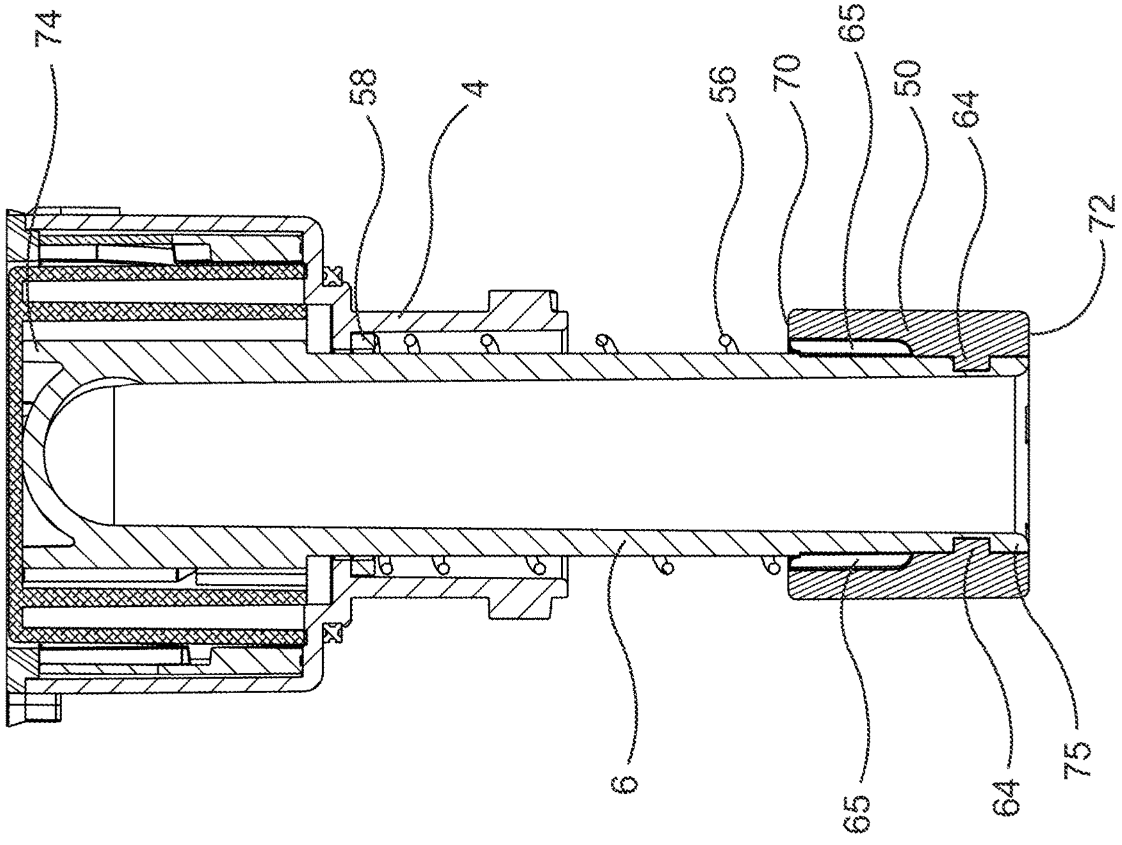
Figure 16A:
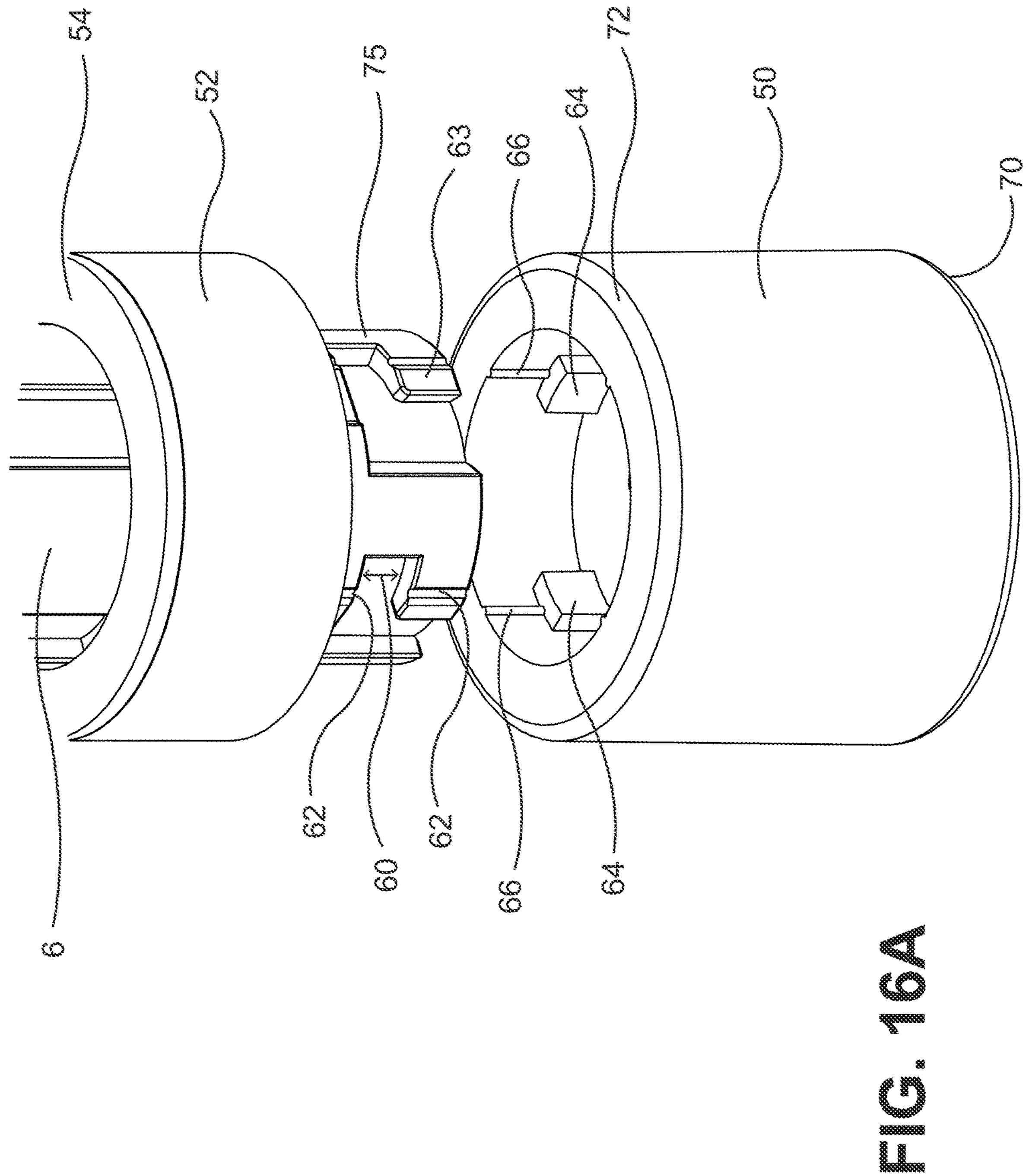
FIG. 16A illustrates a close-up perspective view of the weight retraction system of FIG. 13A with a reversible bayonet detached from the end of the nozzle stem but oriented for weight configuration attachment.
Figure 16B:
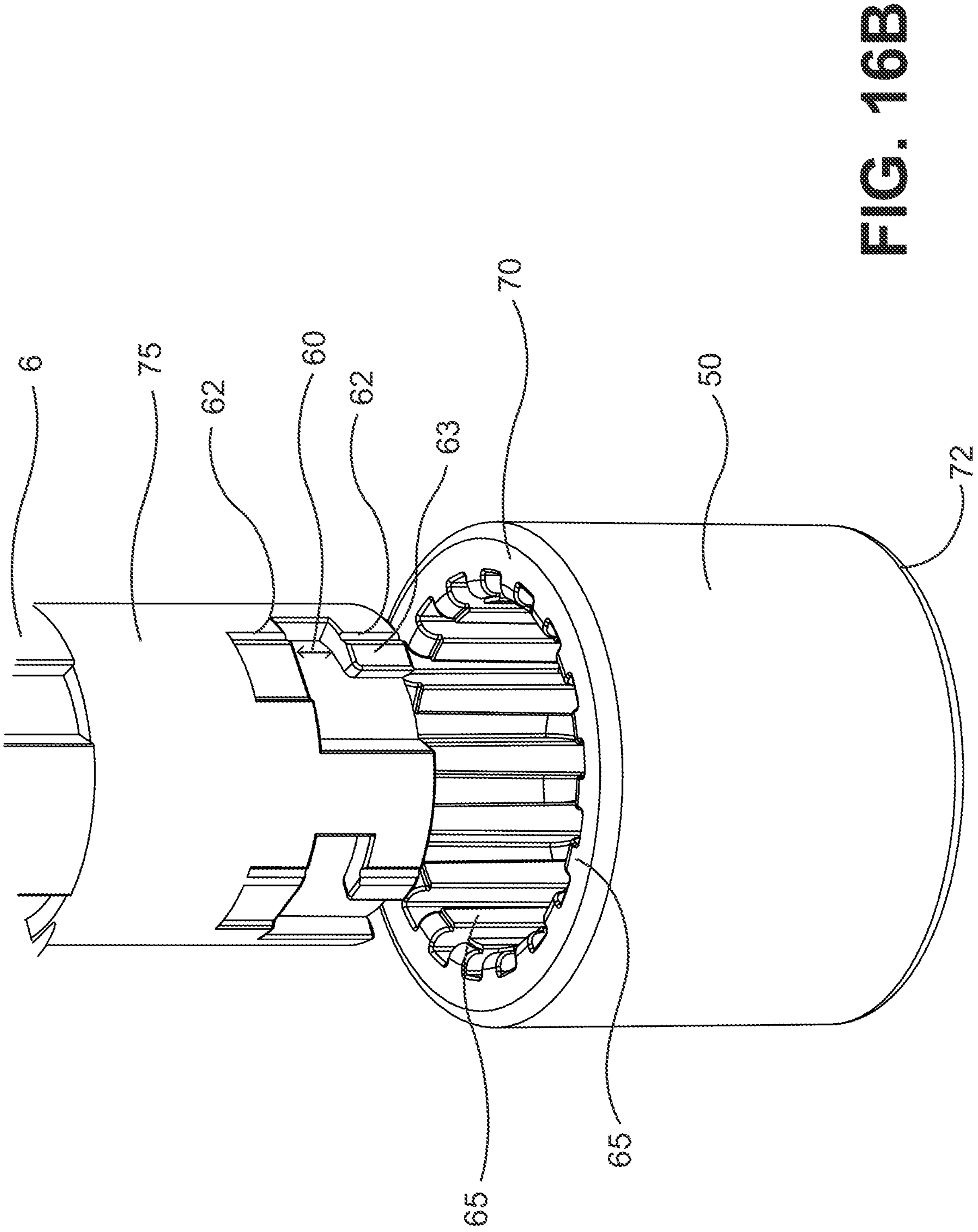
FIGS. 16B and 16C illustrates two close-up perspective views of the weight retraction system of FIG. 13B in different orientations with a reversible bayonet detached from the end of the nozzle stem but oriented for spring configuration attachment.
Figure 16C:
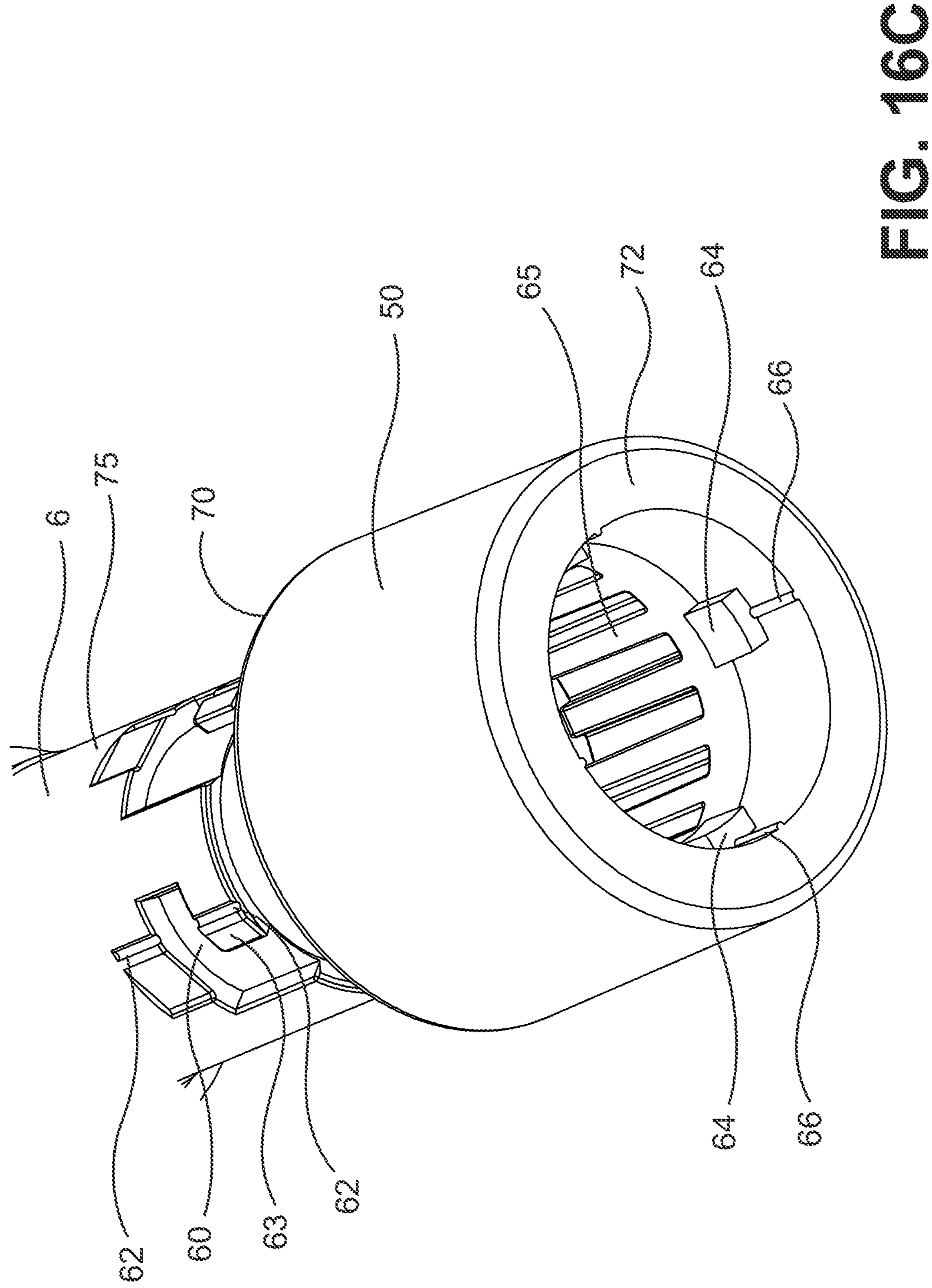

FIGS. 14A and 14B illustrate partially exploded views of the cleaning heads of, respectively, FIGS. 13A and 13B. FIGS. 15A and 15B illustrate cross-sectional views of the cleaning heads of, respectively, FIGS. 13A and 13B taken along respective sectional lines 15A-15A and 15B-15B. FIGS. 16A, and 16B and 16C illustrate close-up views of an embodiment of a reversible bayonet attachment to a stem nozzle second end 75. As shown in FIGS. 14A and 15A, the second end of the nozzle stem 6 includes a bayonet connector 63 configured to securely attach to the reversible bayonet 50. Although there are many ways in which the bayonet connector 63 and reversible bayonet 50 may be configured to securely attach to each other, the figures illustrate particularly useful structures. In the particular embodiments illustrated, the bayonet connector 63 includes bayonet insertion gaps 60 into which the bayonet lugs 64 from the reversible bayonet 50 attach (see also close-up FIGS. 16A, 16B and 16C). The particular embodiment shows four bayonet insertion gaps 60 and four corresponding bayonet lugs 64, though two or more is considered adequate. The length of the turn required to fully engage the nozzle stem 6 and the reversible bayonet 50 depends on the depth of the bayonet insertion gaps 60 and any particular length may be sufficient for a given application. However, in particular embodiments, a quarter turn has been determined to be comfortable for the user, and secure.

In addition to the bayonet insertion gaps 60 and corresponding bayonet lugs 64, the particular embodiment illustrated in the figures also includes two nozzle stem locks 62 for each bayonet insertion gap 60, axially above each bayonet insertion gap 60 and one axially below each bayonet insertion gap 60. The reversible bayonet 50 includes a corresponding bayonet lock 66 extending longitudinally from the bayonet lugs 64 toward an end of the reversible bayonet 50. Although the stem locks 62 are illustrated as indents, they could equivalently be formed as raised stem locks 62 and the bayonet locks 66 could be formed as indents. Additionally, although the locking features 62, 66 are illustrated as a raised line extending longitudinally in relation to the nozzle stem 6, they could equivalently be formed in any shape that can matingly engage and slide into each other such as, without limitation, any raised shape including a circle, rectangle, triangle, other polygon, oval, trapezoid, and the like.

When the reversible bayonet 50 is attached to the nozzle stem 6 in a first orientation with a first end 70 of the reversible bayonet 50 closest to the first end 74 of the nozzle stem 6 the stem locks 62 below the bayonet insertion gap 60 engage with the bayonet locks 66. When the reversible bayonet 50 is attached to the nozzle stem 6 in a second orientation with a second end 72 of the reversible bayonet 50 closest to the first end 74 of the nozzle stem 6 the stem locks 62 above the bayonet insertion gap 60 engage with the bayonet locks 66. Spacer ribs 65 help to stabilize the reversible bayonet 50 and grip the nozzle stem 6 when in the first orientation. Although the shape of the spacer ribs 65 is shown as extending longitudinally within the reversible bayonet 50, between the bayonet lugs 64 toward the first end of the reversible bayonet 50, the shape and spacing of the bayonet lugs 64 is not required for all embodiments.

The bayonet lugs 64 are closer to the second end 72 of the reversible bayonet 50 than to the first end 70. As a result, when the reversible bayonet 50 is attached to the second end of the nozzle stem 6 in a first orientation (FIG. 15B), with the first end 70 of the reversible bayonet 50 closer to the first end 74 of the nozzle stem 6 than the second end 72, the gap between the reversible bayonet 50 and the retainer body 4 when the nozzle stem 6 is fully retracted is smaller than when the reversible bayonet 50 is attached with the second end 72 closer to the first end 74 of the nozzle stem 6. As a result, by reversing the reversible bayonet 50, in other words by flipping it over 180 degrees to attach it to the nozzle stem 6 through a different end of the reversible bayonet 50, and by changing the hardware between the reversible bayonet 50 and the retainer body 4, the cleaning head 2 can be converted from a cleaning head 2 configured to operate as a weighted retraction cleaning head (FIGS. 13A, 14A and 15A) to a cleaning head 2 configured to operate as a spring retraction cleaning head (FIGS. 13B, 14B and 15B). In this way, with minor component changing, the same model of in-floor swimming pool cleaning head can be easily configured to the needed cleaning head type for any installation.

The configuration illustrated below includes a removable and reversible bayonet that provides the appropriate configurations to accommodate either a spring or a weighted configuration. The user merely removes the bayonet and reverses its direction for either configuration. This change is easily accomplished either during manufacturing or in the field when installing.

It will be understood that implementations of an in-floor swimming pool cleaning head are not limited to the specific assemblies, devices and components disclosed in this document, as virtually any assemblies, devices and components consistent with the intended operation of an in-floor cleaning head. Accordingly, for example, although particular in-floor swimming pool cleaning heads, and other assemblies, devices and components are disclosed, such may include any shape, size, style, type, model, version, class, measurement, concentration, material, weight, quantity, and/or the like consistent with the intended operation of an in-floor swimming pool cleaning head. Implementations are not limited to uses of any specific assemblies, devices and components; provided that the assemblies, devices and components selected are consistent with the intended operation of in-floor swimming pool cleaning heads.

Accordingly, the components defining any in-floor swimming pool cleaning head implementations may be formed of any of many different types of materials or combinations thereof that can readily be formed into shaped objects provided that the components selected are consistent with the intended operation of an in-floor swimming pool cleaning head implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various in-floor swimming pool cleaning heads may be manufactured using conventional procedures as added to and improved upon through the procedures described here. Some components defining in-floor swimming pool cleaning heads may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the in-floor swimming pool cleaning heads are not limited to the specific order of steps as disclosed in this document. Any steps or sequence of steps of the assembly of in-floor swimming pool cleaning heads indicated herein are given as examples of possible steps or sequence of steps and not as limitations, since various assembly processes and sequences of steps may be used to assemble an in-floor swimming pool cleaning head.

The implementations of the in-floor swimming pool cleaning heads described are by way of example or explanation and not by way of limitation. Rather, any description relating to the foregoing is for the exemplary purposes of this disclosure, and implementations may also be used with similar results for a variety of other applications requiring an in-floor swimming pool cleaning head.

What is claimed is:

1. An incrementally rotating in-floor swimming pool cleaning head comprising:

a retainer body comprising a first end, and a second end opposite the first end of the retainer body with a plurality of locking lugs on an outer surface of the retainer body adjacent the second end of the retainer body;

a nozzle stem extending through the retainer body, the nozzle stem comprising a cleaning nozzle at a first end of the nozzle stem and a bayonet connector at a second end of the nozzle stem;

a ratcheting pin coupled to the nozzle stem;

a plurality of cam teeth within the retainer body and configured to engage the ratcheting pin, wherein the nozzle stem is configured to reciprocally ratchet in a first angular direction in response to intermittent water pressure passing through the nozzle stem as the plurality of cam teeth engage the ratcheting pin;

a top ring coupled to the first end of the retainer body and comprising an opening sized to allow the nozzle stem to extend through the top ring; and a reversible bayonet comprising a first end comprising a plurality of spacer ribs extending longitudinally within the reversible bayonet from adjacent the first end to a plurality of lugs extending inward from an inner surface of the reversible bayonet, and a second end, wherein the plurality of lugs is closer to the second end than the first end and the plurality of lugs of the reversible bayonet is configured to couple to the bayonet connector of the nozzle stem in each of a first orientation with the first end of the reversible bayonet closest to the first end of the nozzle stem and a second orientation with the second end of the reversible bayonet closest to the first end of the nozzle stem;

wherein when the reversible bayonet is in the first orientation and the cleaning head further comprises a spring washer surrounding the nozzle stem and a spring positioned between the reversible bayonet and the spring washer around the nozzle stem, the cleaning head is configured to operate as a spring powered retracting nozzle; and wherein when the reversible bayonet is in the second orientation and the cleaning head further comprises a retraction weight around the nozzle stem and dampening washer between the retraction weight and the retainer body, the cleaning head is configured to operate as a weighted retraction nozzle.

2. The incrementally rotating in-floor swimming pool cleaning head of claim 1, wherein the bayonet connector on the second end of the nozzle stem further comprises at least one stem lock indent recessed into an outer surface of the nozzle stem and extending longitudinally along a portion of the second end of the nozzle stem on both sides of a bayonet insertion gap recessed into the outer surface of the nozzle stem; and wherein the reversible bayonet further comprises at least one bayonet lock extending longitudinally along the inner surface of the reversible bayonet between the plurality of lugs and the second end of the reversible bayonet; the at least one bayonet lock extending into the at least one stem lock indent of the nozzle stem and engaging the nozzle stem when the reversible bayonet is coupled to the second end of the nozzle stem.

3. The incrementally rotating in-floor swimming pool cleaning head of claim 1, wherein the reversible bayonet is configured to engage the bayonet connector of the nozzle stem through a twist of the reversible bayonet in relation to the nozzle stem.

4. The incrementally rotating in-floor swimming pool cleaning head of claim 1, wherein the plurality of cam teeth within the retainer body exist on an inner surface of a removable cam unit surrounding the nozzle stem within the retainer body, the removable cam unit having no moving parts.

5. The incrementally rotating in-floor swimming pool cleaning head of claim 4, wherein when the plurality of cam teeth engage the ratcheting pin in a first orientation with a first outer edge of the cam unit oriented closest to the top ring, the nozzle stem is configured to reciprocally ratchet in a clockwise direction in response to intermittent water pressure passing through the nozzle stem, and when the plurality of cam teeth on the cam unit engages the ratcheting pin in a second orientation with a second outer edge of the cam unit, opposite the first outer edge, closest to the pin top ring, the nozzle stem is configured to reciprocally ratchet in a counter-clockwise direction in response to intermittent water pressure passing through the nozzle stem.

6. An incrementally rotating in-floor swimming pool cleaning head comprising:

a retainer body comprising a first end, and a second end opposite the first end of the retainer body;

a nozzle stem extending through the retainer body, the nozzle stem comprising a cleaning nozzle at a first end of the nozzle stem and a bayonet connector at a second end of the nozzle stem;

a ratcheting pin coupled to the nozzle stem;

a plurality of cam teeth within the retainer body and configured to engage the ratcheting pin to reciprocally guide the nozzle stem in a first angular direction in response to intermittent water pressure passing through the nozzle stem; and a reversible bayonet comprising a first end comprising a plurality of spacers within the reversible bayonet between the first end and a plurality of lugs extending inward from an inner surface of the reversible bayonet, and a second end, wherein the plurality of lugs is closer to the second end than the first end and the plurality of lugs of the reversible bayonet is configured to couple to the bayonet connector of the nozzle stem in each of a first orientation with the first end of the reversible bayonet closest to the first end of the nozzle stem and a second orientation with the second end of the reversible bayonet closest to the first end of the nozzle stem;

wherein when the reversible bayonet is in the first orientation, the cleaning head is configured to operate as a spring powered retracting nozzle, and wherein when the reversible bayonet is in the second orientation, the cleaning head is configured to operate as a weighted retraction nozzle.

7. The incrementally rotating in-floor swimming pool cleaning head of claim 6, the cleaning head further comprising a spring washer surrounding the nozzle stem and a spring positioned between the reversible bayonet and the spring washer.

8. The incrementally rotating in-floor swimming pool cleaning head of claim 6, the cleaning head further comprising a retraction weight around the nozzle stem and a dampening washer between the retraction weight and the retainer body.

9. The incrementally rotating in-floor swimming pool cleaning head of claim 6, wherein the bayonet connector on the second end of the nozzle stem further comprises at least one stem lock on an outer surface of the nozzle stem on both sides of a bayonet insertion gap; and wherein the reversible bayonet further comprises at least one bayonet lock on the inner surface of the reversible bayonet between the plurality of lugs and the second end of the reversible bayonet; the at least one bayonet lock matingly engaging with the at least one stem lock and engaging the nozzle stem when the reversible bayonet is coupled to the second end of the nozzle stem in each of the first orientation and the second orientation.

10. The incrementally rotating in-floor swimming pool cleaning head of claim 6, wherein the reversible bayonet is configured to engage the bayonet connector of the nozzle stem through a twist of the reversible bayonet in relation to the nozzle stem.

11. The incrementally rotating in-floor swimming pool cleaning head of claim 6, wherein the plurality of cam teeth within the retainer body exist on an inner surface of a removable cam unit surrounding the nozzle stem within the retainer body, the removable cam unit having no moving parts.

12. The incrementally rotating in-floor swimming pool cleaning head of claim 11, wherein when the plurality of cam teeth on the cam unit engage the ratcheting pin in a first orientation with a first outer edge of the cam unit oriented closest to the top ring, the nozzle stem is configured to reciprocally ratchet in a clockwise direction in response to intermittent water pressure passing through the nozzle stem, and when the plurality of cam teeth on the cam unit engages the ratcheting pin in a second orientation with a second outer edge of the cam unit, opposite the first outer edge, closest to the pin top ring, the nozzle stem is configured to reciprocally ratchet in a counter-clockwise direction in response to intermittent water pressure passing through the nozzle stem.

13. An incrementally rotating in-floor swimming pool cleaning head comprising:

a retainer body;

a nozzle stem extending through the retainer body and comprising a cleaning nozzle at a first end of the nozzle stem and a connector at a second end of the nozzle stem;

a ratcheting pin coupled to the nozzle stem;

a plurality of cam teeth within the retainer body and configured to engage the ratcheting pin to reciprocally guide the nozzle stem in a first angular direction in response to intermittent water pressure passing through the nozzle stem; and a reversible bayonet comprising a first end and a second end opposite the first end and having a reversible bayonet connector closer to the second end than to the first end, the reversible bayonet connector configured to engage the connector of the nozzle stem in each of a first orientation with the first end of the reversible bayonet closest to the first end of the nozzle stem and a second orientation with the second end of the reversible bayonet closest to the first end of the nozzle stem.

14. The incrementally rotating in-floor swimming pool cleaning head of claim 13, wherein when the reversible bayonet is in the first orientation, the cleaning head is configured to operate as a spring powered retracting nozzle, and wherein when the reversible bayonet is in the second orientation, the cleaning head is configured to operate as a weighted retraction nozzle.

15. The incrementally rotating in-floor swimming pool cleaning head of claim 13, the cleaning head further comprising a spring washer surrounding the nozzle stem and a spring positioned between the reversible bayonet and the spring washer.

16. The incrementally rotating in-floor swimming pool cleaning head of claim 13, the cleaning head further comprising a retraction weight around the nozzle stem and a dampening washer between the retraction weight and the retainer body.

17. The incrementally rotating in-floor swimming pool cleaning head of claim 13, wherein the connector on the second end of the nozzle stem further comprises at least two stem locks; and wherein the reversible bayonet further comprises at least one bayonet lock on the surface of the reversible bayonet adjacent the second end of the reversible bayonet; the at least one bayonet lock matingly engaging only one of the at least two stem locks and engaging the nozzle stem when the reversible bayonet is coupled to the second end of the nozzle stem in each of the first orientation and the second orientation.

18. The incrementally rotating in-floor swimming pool cleaning head of claim 13, wherein the reversible bayonet is configured to engage the connector of the nozzle stem through a twist of the reversible bayonet in relation to the nozzle stem.

19. The incrementally rotating in-floor swimming pool cleaning head of claim 13, wherein the plurality of cam teeth within the retainer body exist on an inner surface of a removable cam unit surrounding the nozzle stem within the retainer body and the removable cam unit is a stationary cam unit in that it has no parts that move during operation of the cleaning head in relation to any other part of the removable cam unit.

20. The incrementally rotating in-floor swimming pool cleaning head of claim 19, wherein when the plurality of cam teeth on the cam unit engage the ratcheting pin in a first orientation with a first outer edge of the cam unit oriented closest to the top ring, the nozzle stem is configured to reciprocally ratchet in a clockwise direction in response to intermittent water pressure passing through the nozzle stem, and when the plurality of cam teeth on the cam unit engages the ratcheting pin in a second orientation with a second outer edge of the cam unit, opposite the first outer edge, closest to the pin top ring, the nozzle stem is configured to reciprocally ratchet in a counter-clockwise direction in response to intermittent water pressure passing through the nozzle stem.

* * * * *